US010125641B2

(12) United States Patent
Sundaram et al.

(10) Patent No.: US 10,125,641 B2
(45) Date of Patent: Nov. 13, 2018

(54) DUAL INTEGRATED PSA FOR SIMULTANEOUS POWER PLANT EMISSION CONTROL AND ENHANCED HYDROCARBON RECOVERY

(71) Applicant: ExxonMobil Research and Engineering Company, Annandale, NJ (US)

(72) Inventors: Narasimhan Sundaram, Annandale, NJ (US); Hans Thomann, Bedminster, NJ (US); Franklin F. Mittricker, Jamul, CA (US); Loren Starcher, Sugar Land, TX (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 140 days.

(21) Appl. No.: 15/339,987

(22) Filed: Nov. 1, 2016

(65) Prior Publication Data
US 2017/0138222 A1    May 18, 2017

Related U.S. Application Data

(60) Provisional application No. 62/256,341, filed on Nov. 17, 2015.

(51) Int. Cl.
*B01D 53/047* (2006.01)
*C10L 3/10* (2006.01)
(Continued)

(52) U.S. Cl.
CPC .......... *F01K 23/10* (2013.01); *B01D 53/047* (2013.01); *C10L 3/104* (2013.01); *E21B 43/164* (2013.01);
(Continued)

(58) Field of Classification Search
CPC .... E21B 41/0063; E21B 43/164; F01K 23/10; F01K 7/16; F02C 3/00; F05D 2220/32;
(Continued)

(56) References Cited

U.S. PATENT DOCUMENTS

| 4,271,664 A | 6/1981 | Earnest |
| 4,299,596 A | 11/1981 | Benkmann |

(Continued)

FOREIGN PATENT DOCUMENTS

| CN | 103127747 B | 10/2015 |
| EP | 0112640 A1 | 7/1984 |

(Continued)

OTHER PUBLICATIONS

Diagne et al., "Parametric Studies on CO2 Separation and Recovery by a Dual Reflux PSA Process Consisting of Both Rectifying and Stripping Sections", Industrial & Engineering Chemistry Research, Sep. 1995, pp. 3083-3089, vol. 34, iss. 9, ACS Publications.

(Continued)

*Primary Examiner* — Frank M Lawrence, Jr.
(74) *Attorney, Agent, or Firm* — Joseph E. Wrkich

(57) ABSTRACT

Systems and methods are provided for combined cycle power generation and enhanced hydrocarbon production where emission gases during power generation are separated by adsorption and applied to facilitate extraction of hydrocarbons from a reservoir. A power generation plant passes exhaust gas to a first swing adsorption reactor. The first swing adsorption reactor adsorbs the $CO_2$ from the exhaust gas. An adsorption cycle of the first swing adsorption reactor is variable. An injection well injects the $CO_2$ adsorbed by the first swing adsorption reactor in a hydrocarbon reservoir. A production well that is in communication with the injection well produces a mixture of hydrocarbons and $CO_2$. A second (Continued)

swing adsorption reactor purifies the produced hydrocarbons by adsorbing the produced $CO_2$ from the production well.

12 Claims, 4 Drawing Sheets

(51) Int. Cl.
  *F01K 23/10* (2006.01)
  *E21B 43/16* (2006.01)
  *F01K 7/16* (2006.01)
  *F02C 3/00* (2006.01)
  *E21B 41/00* (2006.01)

(52) U.S. Cl.
  CPC ............. *F01K 7/16* (2013.01); *F02C 3/00* (2013.01); *B01D 2256/10* (2013.01); *B01D 2256/245* (2013.01); *B01D 2257/504* (2013.01); *C10L 2290/02* (2013.01); *C10L 2290/10* (2013.01); *C10L 2290/12* (2013.01); *C10L 2290/543* (2013.01); *E21B 41/0064* (2013.01); *F05D 2220/32* (2013.01); *Y02C 10/08* (2013.01); *Y02E 20/16* (2013.01)

(58) Field of Classification Search
  CPC ............. B01D 53/047; B01D 2256/10; B01D 2256/22; B01D 2257/102; B01D 2257/504
  USPC ................ 96/121, 131, 132; 95/139, 96–98; 60/783; 166/265–267
  See application file for complete search history.

(56) References Cited

U.S. PATENT DOCUMENTS

| | | | |
|---|---|---|---|
| 4,744,803 A | 5/1988 | Knaebel | |
| 4,761,167 A * | 8/1988 | Nicholas | B01D 53/047 62/626 |
| 4,858,428 A | 8/1989 | Paul | |
| 5,085,764 A | 2/1992 | Meyers et al. | |
| 5,355,668 A | 10/1994 | Weil et al. | |
| 5,707,425 A | 1/1998 | D'Amico et al. | |
| 6,290,751 B1 | 9/2001 | Ragil et al. | |
| 6,610,124 B1 | 8/2003 | Dolan et al. | |
| 6,902,602 B2 | 6/2005 | Keefer et al. | |
| 7,763,099 B2 | 7/2010 | Verma et al. | |
| 8,262,773 B2 | 9/2012 | Northrop et al. | |
| 8,337,594 B2 | 12/2012 | Corma Canos et al. | |
| 8,557,218 B2 | 10/2013 | Sondaram et al. | |
| 2005/0271914 A1 | 12/2005 | Farooque et al. | |
| 2009/0064653 A1 | 3/2009 | Hagen et al. | |
| 2010/0239373 A1* | 9/2010 | Gillecriosd | B01D 53/002 405/128.5 |
| 2012/0067568 A1* | 3/2012 | Palmer | E21B 36/02 166/256 |
| 2012/0125194 A1 | 5/2012 | Caram et al. | |
| 2012/0318533 A1 | 12/2012 | Keller et al. | |
| 2013/0014484 A1 | 7/2013 | Caprile et al. | |
| 2013/0213229 A1* | 8/2013 | Shahin | B01J 20/267 95/96 |
| 2013/0333391 A1 | 12/2013 | Sundaram et al. | |
| 2014/0130670 A1* | 5/2014 | Eisenberger | B01D 53/02 95/139 |
| 2014/0230445 A1 | 8/2014 | Huntington | |
| 2014/0272613 A1 | 9/2014 | Berlowitz | |
| 2015/0013977 A1* | 1/2015 | Palmer | E21B 36/02 166/266 |

FOREIGN PATENT DOCUMENTS

| | | |
|---|---|---|
| EP | 0212494 A1 | 3/1987 |
| EP | 0923976 A1 | 6/1999 |
| EP | 1022045 A2 | 7/2000 |
| EP | 1413546 A1 | 4/2004 |
| EP | 2220338 B1 | 7/2011 |
| WO | 2008151913 A1 | 12/2008 |
| WO | 2009120779 A2 | 10/2009 |
| WO | 2010044958 A1 | 4/2010 |
| WO | 2010147885 A1 | 12/2010 |
| WO | 2012003079 A1 | 1/2012 |
| WO | 2013062754 A1 | 5/2013 |

OTHER PUBLICATIONS

Reijers et al., "Modeling Study of the Sorption-Enhanced Reaction Process for CO2 Capture. I. Model Development and Validation", Industrial & Engineering Chemistry Research, Jun. 23, 2009, pp. 6966-6974, vol. 48, ACS Publications.
Bensaid et al., "Power and Hydrogen Co-generation from Biogas +", Energy & Fuels, Sep. 16, 2010, pp. 4743-4747, vol. 28, iss. 9, American Chemical Society.
Wright et al., "Caesar: Development of a SEWGS model for IGCC", Energy Procedia, 2011, pp. 1147-1154, vol. 4, Elsevier, ScienceDirect.
Manzolini et al., CO2 Separation From Combined Cycles Using Molten Carbonate Fuel Cells, Journal of Fuel Cell Science and Technology, Feb. 2012, pp. 11018-1 to 11018-8, vol. 9 iss. 1, American Society of Mechanical Engineers.
PCT/US2016/059819 Invitation to Pay Additional Fees dated Feb. 17, 2017.
PCT/US2016/059907 International Search Report and Written opinion dated Feb. 10, 2017.
PCT/US2016/059822 International Search Report and Written opinion dated Jan. 31, 2017.
PCT/US2016/059911 International Search Report and Written opinion dated Jan. 25, 2017.
PCT/US2016/059916 Invitation to Pay Additional Fees dated Feb. 9, 2017.
PCT/US2016/059912 International Search Report and Written opinion dated Feb. 8, 2017.

* cited by examiner

| feed | | blowdown | purge | | repress | |
| repress | | feed | | blowdown | purge |
| blowdown | purge | | repress | | feed |

| feed | | blowdown | purge | | | repress |
| repress | | feed | | blowdown | | purge |
| purge | | repress | | feed | | blowdown |
| blowdown | purge | | repress | | feed | |

| feed | Edown | blowdown | purge | Eup | repress |
| Eup | repress | feed | Edown | blowdown | purge |
| purge | Eup | repress | feed | Edown | blowdown |
| Edown | blowdown | purge | Eup | repress | feed |

DUAL INTEGRATED PSA FOR SIMULTANEOUS POWER PLANT EMISSION CONTROL AND ENHANCED HYDROCARBON RECOVERY

CROSS-REFERENCE TO RELATED APPLICATIONS

This application claims priority to U.S. Provisional Application Ser. No. 62/256,341 filed on Nov. 17, 2015, herein incorporated by reference in its entirety.

FIELD

In various aspects, the invention is related to low emission power production with separation and/or capture of resulting emissions. Further, the invention is related to application of the components of the separation and/or capture in hydrocarbon production wells.

BACKGROUND

Capture of gases emitted from power plants is an area of increasing interest. Power plants based on the combustion of petroleum products generate carbon dioxide as a by-product of the reaction. Historically this carbon dioxide has been released into the atmosphere after combustion. However, it is becoming increasingly desirable to identify ways to find alternative uses for the carbon dioxide generated during combustion.

Combined cycle power plants provide an efficient way to generate electricity from the burning of petroleum products or other carbon-based fuels. Combined cycle power plants can leverage an initial combustion reaction to power multiple turbines for generation of electricity, leading to more efficient power generation. However, conventional methods for capturing carbon dioxide tend to reduce the efficiency of electricity generation, due to the additional energy required to capture and/or sequester the carbon dioxide.

At the same time, existing natural and industrial sources of inert gases cannot meet the growing worldwide demand of $CO_2$ and $N_2$ used for Enhanced Oil Recovery (EOR) and Enhanced Gas Recovery (EGR) at hydrocarbon production wells. In addition, it is becoming imperative to capture and sequester greenhouse gases such as $CO_2$ from power generation plants.

In instances of tertiary recovery of mature oilfields, natural sources of $CO_2$ are produced and distributed, where available, in a pipeline network that provides the $CO_2$ to oilfields where $CO_2$ EOR recovery methods will extend the production lifetime of the oilfield. However, this type of naturally sourced $CO_2$ and associated pipeline infrastructure only exists in certain regions of the U.S., specifically in the Permian Basin and in the Gulf Coast region of the U.S. In many other major oil producing areas, neither naturally sourced $CO_2$ nor a $CO_2$ pipeline network exists. As a result, the demand for $CO_2$ to be used for EOR exceeds the available supply of naturally sourced $CO_2$. Therefore, new technology is required for generating $CO_2$ at low cost.

Furthermore, in light of the emergent need to reduce the emission of $CO_2$ from power plants, there is an acute need for new technology that enables capture of $CO_2$ from power plants at low cost. There is a need for technology that would simultaneously enable the low cost capture of $CO_2$ for EOR and provide $N_2$ for EGR or EOR at a reduced cost in comparison with the conventional technologies (e.g., $N_2$ generation using a cryogenic air separation plant).

SUMMARY

Systems and methods are provided for combined cycle power generation and enhanced hydrocarbon production where emission gases during power generation may be separated by adsorption and applied to facilitate extraction of hydrocarbons from a reservoir.

In one embodiment, a method for optimizing hydrocarbon production comprises: passing recycle exhaust gas from a power generation plant to a first swing adsorption reactor, wherein the exhaust gas includes $CO_2$ and $N_2$; adsorbing the $CO_2$ from the exhaust gas on a first adsorbent material of the first swing adsorption reactor, wherein an adsorption cycle of the first swing adsorption reactor is variable; injecting the $CO_2$ adsorbed by the first swing adsorption reactor in a hydrocarbon reservoir by using an injection well; producing a mixture of hydrocarbons and $CO_2$ by using a production well, which is in communication with the injection well; and purifying the produced hydrocarbons by adsorbing the produced $CO_2$ from the production well on a second adsorbent material of a second swing adsorption reactor.

A $N_2$ stream unadsorbed by the first swing adsorption reactor may exit the first swing adsorption reactor at a pressure that is substantially the same as a pressure of the exhaust gas from the power generation plant. The method for optimizing hydrocarbon production may further comprise recovering a $N_2$ stream unadsorbed by the first swing adsorption reactor, or it may further comprise purging the second swing adsorption reactor with a stream of $N_2$ unadsorbed by the first swing adsorption reactor. The method for optimizing hydrocarbon production may include feeding the purified hydrocarbons back into the power generation plant and generating power.

The adsorption cycle of the first swing adsorption reactor may be varied to adjust composition of adsorbed $CO_2$ based on a composition of hydrocarbons in the hydrocarbon reservoir. The composition of the hydrocarbons in the hydrocarbon reservoir may vary with age of the reservoir. At least one of the first swing adsorption reactor and the second swing adsorption reactor may be a high-temperature reactor. Further, the hydrocarbons may include $CH_4$.

The method for optimizing hydrocarbon production may include purging the first swing adsorption reactor with at least one of steam, a stream of $N_2$, a stream of $CO_2$, and a stream of $CH_4$ and purging the second swing adsorption reactor with at least one of a stream of $CO_2$ and a stream of $CH_4$ flowing from the production well.

In another embodiment, a method for optimizing power generation comprises: passing recycle exhaust gas from a power generation plant to a first swing adsorption reactor, wherein the exhaust gas includes $CO_2$ and $N_2$; adsorbing the $CO_2$ from the exhaust gas on a first adsorbent material of the first swing adsorption reactor, wherein an adsorption cycle of the first swing adsorption reactor is variable; injecting the $CO_2$ adsorbed by the first swing adsorption reactor in a hydrocarbon reservoir by using an injection well; producing a mixture of hydrocarbons and $CO_2$ by using a production well, which is in communication with the injection well; and purifying the produced hydrocarbons by adsorbing the produced $CO_2$ from the production well on a second adsorbent material of a second swing adsorption reactor.

A $N_2$ stream unadsorbed by the first swing adsorption reactor may exit the first swing adsorption reactor at a pressure that is substantially the same as a pressure of the exhaust gas from the power generation plant. The method for optimizing power generation may further comprise recovering a $N_2$ stream unadsorbed by the first swing adsorption reactor, or it may further comprise purging the second swing adsorption reactor with a stream of $N_2$ unadsorbed by the first swing adsorption reactor. The method for optimizing power generation may include feeding the purified hydrocarbons back into the power generation plant and generating power.

The adsorption cycle of the first swing adsorption reactor may be varied to adjust composition of adsorbed $CO_2$ based on a composition of hydrocarbons in the hydrocarbon reservoir. The composition of the hydrocarbons in the hydrocarbon reservoir may vary with age of the reservoir. At least one of the first swing adsorption reactor and the second swing adsorption reactor may be a high-temperature reactor. Further, the hydrocarbons may include $CH_4$.

The method for optimizing power generation may include purging the first swing adsorption reactor with at least one of steam, a stream of $N_2$, a stream of $CO_2$, and a stream of $CH_4$ and purging the second swing adsorption reactor with at least one of a stream of $CO_2$ and a stream of $CH_4$ flowing from the production well.

One example of the present invention is system for optimizing hydrocarbon production, comprising: a power generation plant that produces recycle exhaust gas, wherein the exhaust gas includes $CO_2$ and $N_2$; a first swing adsorption reactor, wherein the power generation plant passes the exhaust gas to the first swing adsorption reactor, wherein the first swing adsorption reactor adsorbs the $CO_2$ from the exhaust gas on a first adsorbent material of the first swing adsorption reactor, and wherein an adsorption cycle of the first swing adsorption reactor is variable; an injection well that injects the $CO_2$ adsorbed by the first swing adsorption reactor in a hydrocarbon reservoir; a production well that is in communication with the injection well and that produces a mixture of hydrocarbons and $CO_2$; and a second swing adsorption reactor that purifies the produced hydrocarbons by adsorbing the produced $CO_2$ from the production well on a second adsorbent material of the second swing adsorption reactor.

The adsorption cycle of the first swing adsorption reactor may be varied to adjust composition of adsorbed $CO_2$ based on a composition of hydrocarbons in the hydrocarbon reservoir. The purified hydrocarbons may be fed back into the power generation plant to generate power.

Another example of the present invention is a system for optimizing power generation, comprising: a power generation plant that produces recycle exhaust gas, wherein the exhaust gas includes $CO_2$ and $N_2$; a first swing adsorption reactor, wherein the power generation plant passes the exhaust gas to the first swing adsorption reactor, wherein the first swing adsorption reactor adsorbs the $CO_2$ from the exhaust gas on a first adsorbent material of the first swing adsorption reactor, and wherein an adsorption cycle of the first swing adsorption reactor is variable; an injection well that injects the $CO_2$ adsorbed by the first swing adsorption reactor in a hydrocarbon reservoir; a production well that is in communication with the injection well and that produces a mixture of hydrocarbons and $CO_2$; and a second swing adsorption reactor that purifies the produced hydrocarbons by adsorbing the produced $CO_2$ from the production well on a second adsorbent material of the second swing adsorption reactor.

DETAILED DESCRIPTION OF THE EMBODIMENTS

Figure 1:
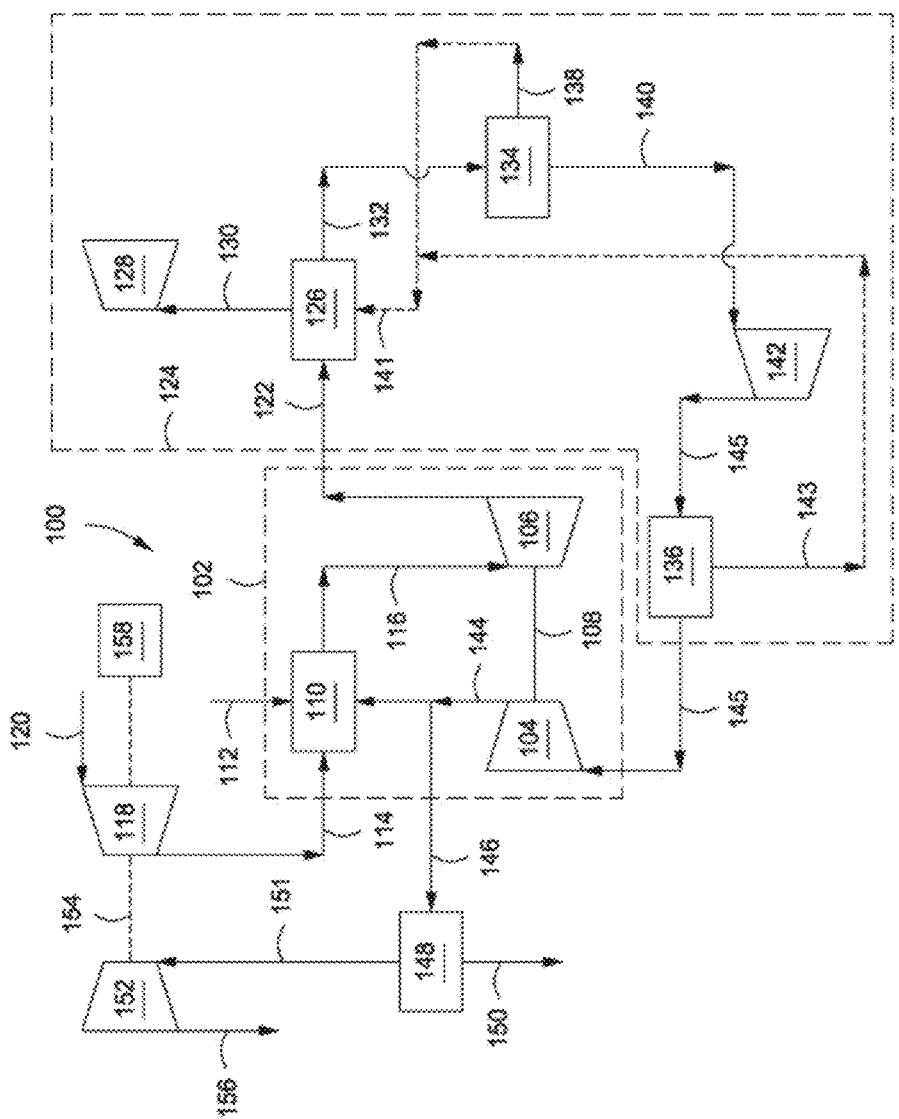
FIG. 1 schematically shows an example of a combined cycle system for generating electricity based on combustion of a carbon-based fuel.

In various aspects, systems and methods are provided for power generation using turbines while reducing and/or mitigating emissions during power generation. In a combined cycle generation system, the flue gas from a combustion reaction for a gas turbine can also be used to power a steam turbine. The flue gas can then be recycled for use as part of the input to the gas turbine. A portion of the recycled exhaust gas can be effectively separated to generate a high purity carbon dioxide stream, while reducing and/or minimizing the energy required for the separation, and without needing to reduce the temperature of the flue gas. This can allow another (e.g., the remaining) portion of the recycled exhaust gas, which can typically be composed of a majority of nitrogen, to be used to generate additional electricity, e.g., without having to adjust the pressure and/or temperature of the recycled exhaust gas to accommodate the conditions required for the carbon dioxide separation process. Thus, improved energy recovery can be realized from the combined cycle system, while also generating relatively high purity streams of carbon dioxide and nitrogen.

A variety of system configuration and processing conditions can contribute to power generation with low emissions that can also be effectively separated and/or captured for further use. For example, the input gas flow for the combustor to the gas turbine can be selected to have a desirable composition, e.g., a roughly stoichiometric ratio of fuel to oxygen. Having a roughly stoichiometric ratio of fuel to oxygen can reduce the amount of unreacted oxygen present in the gas output after combustion. This can facilitate separation of the other combustion products, as well as potentially reducing/eliminating the production of $NO_x$ species. More generally, a roughly stoichiometric combustion reaction with a desirable feed can result in an exhaust primarily composed of $CO_2$, $N_2$, and $H_2O$.

Another example of a system configuration and/or process condition that can contribute to power generation with low emission that can be effectively separated and/or captured can include using recycled exhaust gas as part of the input gas flow. The gas flow exiting the combustion process can advantageously be used to power a gas turbine. After powering the gas turbine, this gas flow corresponds to an exhaust gas. This exhaust gas can be used in a combined cycle configuration power a steam turbine by using a heat exchanger to extract heat from the exhaust gas. This exhaust gas can then be recycled, after removal of water, for use as part of the input gas flow. The exhaust gas can advantageously have an elevated volume percentage of $CO_2$ relative to ambient air, which can also assist in selecting the $CO_2$ content of the input gas flow to the combustion reaction. Controlling the amount of $CO_2$ in the combustion products can be beneficial for enhancing the energy output captured from the combustion reaction.

Recycling all of the exhaust gas can allow for all of the carbon in the exhaust to be maintained in a single stream until the stream can be diverted to a carbon capture process. Typically, though, less than all of the recycled exhaust gas may be needed to provide additional gas for the input gas flow to combustion. As a result, any excess exhaust gas can be diverted, e.g., for separation into high purity $CO_2$ and $N_2$ gas streams. A convenient location in the process to perform this diversion can be after the recycled exhaust gas has been modified to achieve the temperature and pressure desired for the input gas flow to combustion. At this point, it can be desirable to perform the separation of $CO_2$ and $N_2$ while reducing/minimizing the amount of energy lost due to temperature/pressure reductions. For example, typical solvent methods for separating $CO_2$ and $N_2$ require a reduction in the temperature of the recycled exhaust gas. For such conventional solvent methods, in order to preserve as much energy in the $N_2$ stream as possible, heat exchangers can be used to transfer heat from the recycled exhaust gas to the separated $N_2$ stream.

In some aspects, the separation of $CO_2$ and $N_2$ can be performed by using a pressure swing adsorption (PSA) process to separate the $CO_2$ and $N_2$ at the temperature and pressure of the input gas flow to the combustion reaction. Using pressure swing adsorption to perform the separation can allow for recovery, for example, of at least about 60% (such as at least about 65%, at least about 70%, at least about 75%, at least about 80%, at least about 85%, at least about 90%, at least about 95%, at least about 97%, at least about 98%, at least about 99%, at least about 99.3%, or at least about 99.5%) of the $CO_2$ in the recycled exhaust gas, e.g., while also generating an $N_2$ stream with at least about 90% purity (such as at least about 93% purity, at least about 95% purity, at least about 97% purity, at least about 98% purity, or at least about 99% purity) and/or a $CO_2$ stream with at least about 80% purity (such as at least about 85% purity, at least about 90% purity, at least about 95% purity, at least about 97% purity, at least about 98% purity, at least about 99% purity, at least about 99.3% purity, or at least about 99.5% purity).

In various aspects, the operating conditions for a PSA reactor can be selected to facilitate the power generation process while still effectively capturing the exhaust gases. Using a relatively high temperature PSA can preserve the energy content of the $N_2$ portion of the recycled exhaust gas, so that the $N_2$ gas stream can be used to power an additional turbine for electricity generation. By contrast, a conventional separation method for $CO_2$ separation such as solvent separation can typically require adjustment of the temperature and/or pressure of the stream to facilitate the separation. Thus, instead of requiring energy to modify the recycled exhaust prior to treating the exhaust gases, use of a PSA reactor can allow the capture process to be adjusted to match the operating conditions for power generation.

The high temperature PSA can also be performed using a process cycle avoiding the need for high temperature steam and/or another energy intensive purge gas. This can allow high purity $CO_2$ to be recovered while reducing/minimizing the amount of energy lost to capture of the exhaust gases.

Combined Cycle Process for Power Generation with Low Emissions

In various aspects, systems and methods are provided for generating power while controlling and/or capturing the emissions produced during power generation. One goal of power generation is to use input feeds (such as fuels) as efficiently as possible, so that power generation can be increased/optimized for a given amount of fuel and/or of equipment. Based on the conditions for effective power generation, a goal for control/capture of emissions can be to provide effective capture of emissions while reducing/minimizing the changes to the conditions for power generation.

As used herein, the term "stoichiometric combustion" refers to a combustion reaction having a volume of reactants comprising a fuel and an oxidizer and a volume of products formed by combusting the reactants, where substantially the entire volume of the reactants is used to form the products. As used herein, the term "substantially stoichiometric combustion" refers to a combustion reaction having a molar ratio of combustion fuel to oxygen ranging from plus to minus about 10%, e.g., from about plus to minus about 5%, of the oxygen required for a stoichiometric ratio. For example, the stoichiometric ratio of fuel to oxygen for methane is 1:2 ($CH_4 + 2O_2 \leftrightarrows CO_2 + 2H_2O$), whereas propane should have a stoichiometric ratio of fuel to oxygen of 1:5. Another way of measuring substantially stoichiometric combustion can be as a ratio of oxygen supplied to oxygen required for stoichiometric combustion, e.g., from about 0.9:1 to about 1.1:1 or from about 0.95:1 to about 1.05:1.

In some aspects, the processes described herein can be used to produce ultra low emission electric power and $CO_2$ for EOR, enhanced hydrocarbon recovery (EHR), and/or sequestration/capture applications; in such cases, the process conditions for EOR/EHR may be similar to sequestration/capture application or may be slightly different. In one or more aspects, a mixture of oxygen-enriched gas (e.g., enriched air) and fuel can be stoichiometrically or substantially stoichiometrically combusted and simultaneously mixed with a stream of recycled exhaust gas. The stream of recycled exhaust gas, generally including products of combustion such as $CO_2$, can be used as a diluent to control, adjust, and/or otherwise moderate the temperature of combustion and the exhaust that enters the succeeding expander. As a result of using oxygen enrichment, the recycled exhaust gas can have an increased $CO_2$ content, thereby allowing the expander to operate at even higher expansion ratios for the same inlet and discharge temperatures, thereby producing significantly increased power.

Combustion in commercial gas turbines at stoichiometric conditions or substantially stoichiometric conditions (e.g., "slightly rich" combustion) can prove advantageous to eliminate the cost of excess oxygen removal. By cooling the exhaust and condensing the water out of the cooled exhaust stream, a relatively high content $CO_2$ exhaust stream can be produced. While a portion of the recycled exhaust gas can be utilized for temperature moderation in a closed Brayton cycle, a remaining purge stream can be used for EOR and/or enhanced hydrocarbon recovery applications and/or electric power can be produced with little or no sulfur oxides ($SO_x$), nitrogen oxides ($NO_x$), and/or $CO_2$ being emitted to the atmosphere. The result of this process can include the production of power in three separate cycles and the manufacturing of additional $CO_2$. In some aspects, performing stoichiometric combustion can allow for generation of an exhaust stream consisting substantially of $CO_2$, $H_2O$, and $N_2$. An exhaust stream consisting substantially of $CO_2$, $H_2O$, and $N_2$ is defined as an exhaust stream that contains about 5 mol % or less of other gas molecules, e.g., about 2.5 mol % or less or about 1 mol % or less.

FIG. 1 depicts a schematic of an illustrative integrated system 100 for power generation and $CO_2$ recovery using a combined-cycle arrangement, according to one or more embodiments. In at least one embodiment, the power generation system 100 can include a gas turbine system 102 characterized as a power-producing, closed Brayton cycle. The gas turbine system 102 can have a first or main compressor 104 coupled to an expander 106 via a shaft 108. The shaft 108 can be any mechanical, electrical, and/or other power coupling, thereby allowing a portion of the mechanical energy generated by the expander 106 to drive the main compressor 104. In at least one embodiment, the gas turbine system 102 can be a standard gas turbine, where the main compressor 104 and expander 106 form the compressor and expander ends, respectively. In other embodiments, however, the main compressor 104 and expander 106 can be individualized components in the system 102.

The gas turbine system 102 can also include a combustion chamber 110 configured to combust a fuel introduced via line 112 mixed with an oxidant introduced via line 114. In one or more embodiments, the fuel in line 112 can include any suitable hydrocarbon gas or liquid, such as natural gas, methane, ethane, naphtha, butane, propane, syngas, diesel, kerosene, aviation fuel, coal derived fuel, bio-fuel, oxygenated hydrocarbon feedstock, or any combinations thereof. The oxidant via line 114 can be derived from a second or inlet compressor 118 fluidly coupled to the combustion chamber 110 and adapted to compress a feed oxidant introduced via line 120. In one or more embodiments, the feed oxidant in line 120 can include atmospheric air, enriched air, or combinations thereof. When the oxidant in line 114 includes a mixture of atmospheric air and enriched air, the enriched air can be compressed by the inlet compressor 118 before and/or after being mixed with the atmospheric air. The enriched air can have an overall oxygen concentration of at least about 30 vol %, e.g., at least about 35 vol %, at least about 40 vol %, at least about 45 vol %, at least about 50 vol %, from about 30 vol % to about 70 vol %, from about 30 vol % to about 65 vol %, from about 30 vol % to about 60 vol %, from about 30 vol % to about 55 vol %, from about 30 vol % to about 50 vol %, from about 35 vol % to about 70 vol %, from about 35 vol % to about 65 vol %, from about 35 vol % to about 60 vol %, from about 35 vol % to about 55 vol %, from about 35 vol % to about 50 vol %, from about 40 vol % to about 70 vol %, from about 40 vol % to about 65 vol %, from about 40 vol % to about 60 vol %, from about 40 vol % to about 55 vol %, from about 40 vol % to about 50 vol %, from about 45 vol % to about 70 vol %, from about 45 vol % to about 65 vol %, from about 45 vol % to about 60 vol %, from about 45 vol % to about 55 vol %, from about 45 vol % to about 50 vol %, from about 50 vol % to about 70 vol %, from about 50 vol % to about 65 vol %, or from about 50 vol % to about 60 vol %.

The enriched air can be derived from any one or more of several sources, including implementing various technologies upstream of the inlet compressor 118 to produce the enriched air. For example, the enriched air can be derived from such separation technologies as membrane separation, pressure swing adsorption, temperature swing adsorption, nitrogen plant-byproduct streams, and/or combinations thereof. The enriched air can additionally or alternatively be derived from an air separation unit (ASU), such as a cryogenic ASU, for producing nitrogen for pressure maintenance or other purposes. The reject stream from the ASU can be rich in oxygen, e.g., having an overall oxygen content from about 50 vol % to about 70 vol %. This reject stream can be used as at least a portion of the enriched air and subsequently diluted, if needed, with unprocessed atmospheric air to obtain the desired oxygen concentration for the application.

As will be described in more detail below, the combustion chamber 110 can also receive a compressed recycle exhaust gas in line 144, including an exhaust gas recirculation primarily having $CO_2$ and nitrogen components. The compressed recycle exhaust gas in line 144 can be derived from the main compressor 104 and adapted to help facilitate a stoichiometric or substantially stoichiometric combustion of the compressed oxidant in line 114 and fuel in line 112 by moderating the temperature of the combustion products. As can be appreciated, recirculating the exhaust gas can serve to increase the $CO_2$ concentration in the exhaust gas.

An exhaust gas in line 116 directed to the inlet of the expander 106 can be generated as a product of combustion of the fuel in line 112 and the compressed oxidant in line 114, in the presence of the compressed recycle exhaust gas in line 144. In at least one embodiment, the fuel in line 112 can be primarily natural gas, thereby generating a discharge or exhaust gas via line 116 that can include volumetric portions of vaporized water, $CO_2$, nitrogen, nitrogen oxides ($NO_x$), and sulfur oxides ($SO_x$). In some embodiments, a small portion of unburned fuel in line 112 or other compounds can also be present in the exhaust gas in line 116 due to combustion equilibrium limitations. As the exhaust gas in line 116 expands through the expander 106, it can generate mechanical power to drive the main compressor 104, an electrical generator, and/or other facilities, and can also produce a gaseous exhaust in line 122 having a heightened $CO_2$ content resulting from the influx of the compressed recycle exhaust gas in line 144. In some implementations, the expander 106 may be adapted to produce additional mechanical power that may be used for other purposes.

Additionally or alternately, the power generation system 100 can include an exhaust gas recirculation (EGR) system 124, which can include a heat recovery steam generator (HRSG) 126, or similar device, fluidly coupled to a steam gas turbine 128. In at least one embodiment, the combination of the HRSG 126 and the steam gas turbine 128 can be characterized as a power-producing closed Rankine cycle. In combination with the gas turbine system 102, the HRSG 126 and the steam gas turbine 128 can form part of a combined-cycle power generating plant, such as a natural gas combined-cycle (NGCC) plant. The gaseous exhaust in line 122 can be introduced to the HRSG 126 in order to generate steam via line 130 and a cooled exhaust gas in line 132. Additionally or alternatively, the steam in line 130 can be sent to the steam gas turbine 128 to generate additional electrical power.

The cooled exhaust gas in line 132 can be sent to a first cooling unit 134 adapted to cool the cooled exhaust gas in line 132 and generate a cooled recycle gas stream 140. The first cooling unit 134 can include, for example, one or more contact coolers, trim coolers, evaporative cooling unit, or any combination thereof. The first cooling unit 134 can additionally or alternatively be adapted to remove a portion of any condensed water from the cooled exhaust gas in line 132 via a water dropout stream 138. In at least one embodiment, the water dropout stream 138 may be routed to the HRSG 126 via line 141 to provide a water source for the generation of additional steam in line 130 therein. Additionally or alternatively, the water recovered via the water dropout stream 138 can be used for other downstream applications, such as supplementary heat exchanging processes.

In most embodiments, the cooled recycle gas stream 140 can be directed to a boost compressor 142. Cooling the cooled exhaust gas in line 132 in the first cooling unit 134 can reduce the power required to compress the cooled recycle gas stream 140 in the boost compressor 142. As opposed to a conventional fan or blower system, the boost compressor 142 can be configured to compress, and thus increase, the overall density of the cooled recycle gas stream 140, thereby directing a pressurized recycle gas in line 145 downstream, where the pressurized recycle gas in line 145 can thus exhibit an increased mass flow rate for the same volumetric flow. This can prove advantageous, since the main compressor 104 can be volume-flow limited, and directing more mass flow through the main compressor 104 can result in higher discharge pressures, thereby translating into higher pressure ratios across the expander 106. Higher pressure ratios generated across the expander 106 can allow for higher inlet temperatures and, therefore, an increase in expander 106 power and/or efficiency. As can be appreciated, this may prove advantageous, since the $CO_2$-rich exhaust gas in line 116 can generally maintain a higher specific heat capacity.

Since the suction pressure of the main compressor 104 can typically be a function of its suction temperature, a cooler suction temperature can generally demand less power to operate the main compressor 104 for the same mass flow. Consequently, the pressurized recycle gas in line 145 can optionally be directed to a second cooling unit 136, e.g., which can include one or more direct contact coolers, trim coolers, evaporative cooling units, or any combination thereof. In at least one embodiment, the second cooling unit 136 can serve as an aftercooler adapted to remove at least a portion of the heat of compression generated by the boost compressor 142 on the pressurized recycle gas in line 145. The second cooling unit 136 can additionally or alternately extract additional condensed water via a water dropout stream 143. In some such embodiments, the water dropout streams 138,143 can converge into stream 141 and may or may not be routed to the HRSG 126 to generate additional steam via line 130 therein. While only first and second cooling units 134,136 are depicted herein, any desired number of cooling units can be employed to suit a variety of applications, without departing from the scope of the disclosure.

The main compressor 104 can be configured to receive and compress the pressurized recycle gas in line 145 to a pressure nominally at or above the pressure of the combustion chamber 110, thereby generating the compressed recycle exhaust gas in line 144. As can be appreciated, cooling the pressurized recycle gas in line 145 in the second cooling unit 136 after compression in the boost compressor 142 can allow for an increased volumetric mass flow of exhaust gas into the main compressor 104. Consequently, this can reduce the amount of power required to compress the pressurized recycle gas in line 145 to a predetermined pressure.

In many embodiments, a purge stream 146 can be recovered from the compressed recycle exhaust gas in line 144 and subsequently treated in a $CO_2$ separator 148 to capture $CO_2$ at an elevated pressure via line 150. Preferably, the $CO_2$ separator can be a pressure swing adsorption unit, as described in further detail below. The separated $CO_2$ in line 150 can be used for sales, used in another processes requiring $CO_2$, and/or further compressed and injected into a terrestrial reservoir for EOR, EHR, sequestration, or another purpose. Because of the stoichiometric or substantially stoichiometric combustion of the fuel in line 112 combined with a boosted pressure from the boost compressor 142, the $CO_2$ partial pressure in the purge stream 146 can be much higher than in conventional gas turbine exhausts.

A residual stream 151, essentially depleted of $CO_2$ and consisting primarily of nitrogen, can additionally or alternately be derived from the $CO_2$ separator 148. In some embodiments, the residual stream 151 can be introduced to a gas expander 152 to provide power and an expanded depressurized gas, or exhaust gas, via line 156. The expander 152 can be, for example, a power-producing nitrogen expander. As depicted, the gas expander 152 can be optionally coupled to the inlet compressor 118 through a common shaft 154 or other mechanical, electrical, or other power coupling, thereby allowing a portion of the power generated by the gas expander 152 to drive the inlet compressor 118. However, during startup of the system 100 and/or during normal operation, when the gas expander 152 is unable to supply all the required power to operate the inlet compressor 118, at least one motor 158, such as an electric motor, can be used synergistically with the gas expander 152. For instance, the motor 158 can be sensibly sized such that, during normal operation of the system 100, the motor 158 can be configured to supply the power short-fall from the gas expander 152. In other embodiments, however, the gas expander 152 can be used to provide power to other applications, and not directly coupled to the inlet compressor 118. For example, there may be a substantial mismatch between the power generated by the expander 152 and the requirements of the compressor 118. In such cases, the expander 152 could be adapted to drive a smaller (or larger) compressor (not shown) that may demand less (or more) power.

An expanded depressurized gas in line 156, primarily consisting of dry nitrogen gas, can be discharged from the gas expander 152. In at least one embodiment, the combination of the gas expander 152, inlet compressor 118, and $CO_2$ separator 148 can be characterized as an open Brayton cycle, and/or a third power-producing component of the power generation system 100. Conventional systems and methods of expanding the nitrogen gas in the residual stream 151, and variations thereof, are believed to be known in the art and are thus not discussed herein.

Additionally or alternately, gas expander 152 can be replaced and/or complemented with a downstream compressor 158. At least a portion (and up to all) of the residual stream 151 can be compressed in a downstream compressor to generate a compressed exhaust gas via line 160, which can be suitable for injection into a reservoir for pressure maintenance applications. In applications where methane gas is typically reinjected into hydrocarbon wells to maintain well pressures, compressing the residual stream 151 may prove advantageous. For example, the pressurized nitrogen gas in line 160 can instead be injected into the hydrocarbon wells, and any residual methane gas can be sold or otherwise used as fuel in related applications, such as in line 112.

By using enriched air as the compressed oxidant in line 114 and pressurizing the exhaust gas in the boost compressor 142, the power generation system 100 can achieve higher concentrations of $CO_2$ in the exhaust gas, thereby allowing for more effective $CO_2$ separation and capture. Embodiments disclosed herein, for example, can effectively increase the concentration of $CO_2$ in the exhaust gas in line 116 to $CO_2$ concentrations ranging from about 10 vol % to about 20 vol %. To achieve such $CO_2$ concentrations, the combustion chamber 110 can be adapted to stoichiometrically or substantially stoichiometrically combust an incoming mixture of fuel in line 112 and compressed oxidant in line 114, where the compressed oxidant in line 114 can include a stream having an oxygen content greater than about 21 vol %, e.g., enriched air, such as having an overall oxygen concentration of about 30 vol %, about 35 vol %, about 40 vol %, about 45 vol %, or about 50 vol %.

In order to moderate the temperature of the stoichiometric combustion and meet expander 106 inlet temperature and component cooling requirements, a portion of the exhaust gas with increased $CO_2$ content derived from the compressed recycle exhaust gas in line 144 can be injected into the combustion chamber 110 as a diluent. Thus, embodiments of the disclosure can essentially eliminate excess oxygen from the exhaust gas in line 116, while advantageously increasing its $CO_2$ concentration, e.g., up to about 20 vol % or optionally higher. As such, the gaseous exhaust in line 122 can have less than about 3.0 vol % oxygen, for example less than about 1.0 vol % oxygen, less than about 0.1 vol % oxygen, or less than about 0.01 vol % oxygen.

At least one benefit of having an increased $CO_2$ concentration can be that the expander 106 can be operated at an even higher expansion ratio for the same inlet and discharge temperatures, and can thereby produce increased power. This can be due to the higher heat capacity of $CO_2$ relative to nitrogen found in ambient air. In one or more aspects, the expansion ratio of the expander 106 can be increased from about 17.0 to about 20.0, corresponding to about 10 vol % and about 20 vol % $CO_2$ recycle streams, respectively. For example, enriched air having about 35 vol % oxygen can be used in order to achieve the about 20 vol % in the $CO_2$ recycle stream.

Additional or alternate benefits of having an increased $CO_2$ concentration in the recycle gas can include, but are not limited to, an increased concentration of $CO_2$ in the extracted purge stream 146 used for $CO_2$ separation. Because of its increased $CO_2$ concentration, the purge stream 146 need not be as large in order to extract the required amounts of $CO_2$. For example, the equipment handling extraction for $CO_2$ separation can be smaller, including its piping, heat exchangers, valves, absorber towers, etc. Moreover, increased concentrations of $CO_2$ can improve the performance of $CO_2$ removal technology, including using low-energy separation processes, such as employing less energy-intensive solvents that would otherwise be untenable. Consequently, capital expenditures for capturing $CO_2$ can be dramatically lowered.

An example of operation of the system 100 will now be discussed. As should be appreciated, specific temperatures and pressures achieved/experienced in the various components of any of the embodiments disclosed herein can change depending on, among other factors, the purity of the oxidant used and/or the specific makes and/or models of expanders, compressors, coolers, etc. Accordingly, it should be appreciated that the particular data described herein is for illustrative purposes only and should not be construed as the only interpretation thereof. In an embodiment, the inlet compressor 118 can provide compressed oxidant in line 114 at a pressure between about 280 psia (about 1.9 MPa) and about 300 psia (about 2.1 MPa). Also contemplated herein, however, is aeroderivative gas turbine technology, which can produce and consume pressures of up to about 750 psia (about 5.2 MPa) and higher.

The main compressor 104 can be configured to recycle and compress recycled exhaust gas into the compressed recycle exhaust gas in line 144 at a pressure nominally at or above the combustion chamber 110 pressure, and to use a portion of that recycled exhaust gas as a diluent in the combustion chamber 110. Because amounts of diluent needed in the combustion chamber 110 can depend on the purity of the oxidant used for stoichiometric combustion or the particular model/design of expander 106, a ring of thermocouples and/or oxygen sensors (not shown) can be disposed on the outlet of the expander 106. In operation, the thermocouples and/or sensors can be adapted to regulate and determine the volume of exhaust gas required as diluent needed to cool the products of combustion to the required expander inlet temperature, and also to provide feedback to regulate the amount of oxidant being injected into the combustion chamber 110. Thus, in response to the heat requirements detected by the thermocouples and/or the oxygen levels detected by the oxygen sensors, the volumetric mass flow of compressed recycle exhaust gas in line 144 and compressed oxidant in line 114 can be manipulated up or down to track the demand.

In at least one embodiment, a pressure drop of about 12-13 psi (about 83-90 kPa) can be experienced across the combustion chamber 110 during stoichiometric or substantially stoichiometric combustion. Combustion of the fuel in line 112 and the compressed oxidant in line 114 can generate temperatures between about 2000° F. (about 1093° C.) and about 3000° F. (about 1649° C.) and pressures ranging from about 250 psia (about 1.7 MPa) to about 300 psia (about 2.1 MPa). As described above, because of the increased mass flow and higher specific heat capacity of the $CO_2$-rich exhaust gas derived from the compressed recycle exhaust gas in line 144, higher pressure ratios can be achieved across the expander 106, thereby allowing for higher inlet temperatures and increased expander 106 power.

The gaseous exhaust in line 122 exiting the expander 106 can exhibit pressures at or near ambient, e.g., about 13-17 psia (about 90-120 kPa). The temperature of the gaseous exhaust in line 122 can be from about 1225° F. (about 663° C.) to about 1275° F. (about 691° C.) before passing through the HRSG 126 to generate steam in line 130 and a cooled exhaust gas in line 132. In one or more embodiments, the cooling unit 134 can reduce the temperature of the cooled exhaust gas in line 132, thereby generating the cooled recycle gas stream 140 having a temperature between about 32° F. (about 0° C.) and about 120° F. (about 49° C.). As can be appreciated, such temperatures can fluctuate, e.g., depending on wet bulb temperatures during specific seasons in specific locations around the globe.

According to one or more embodiments, the boost compressor 142 can be configured to elevate the pressure of the cooled recycle gas stream 140 to a pressure ranging from about 17 psia (about 120 kPa) to about 21 psia (about 140 kPa). As a result, the main compressor 104 can eventually receive and compress a recycled exhaust with a higher density and increased mass flow, thereby allowing for a substantially higher discharge pressure while maintaining the same or similar pressure ratio. In order to further increase the density and mass flow of the recycle exhaust gas, the pressurized recycle gas in line 145 discharged from the boost compressor 142 can then be further cooled in the optional second cooling unit 136, which can, in some embodiments, be configured to reduce the pressurized recycle gas temperature in line 145 to about 105° F. (about 41° C.) before being directed to the main compressor 104.

Additionally or alternately, the temperature of the compressed recycle exhaust gas in line 144 discharged from the main compressor 104, and consequently the temperature of the purge stream 146, can be about 800° F. (about 427° C.), with a pressure of around 280 psia (about 1.9 MPa). The addition of the boost compressor 142 and the stoichiometric combustion of enriched air can increase the $CO_2$ purge pressure in the purge stream 146, which can lead to improved solvent treating performance in the $CO_2$ separator 148 due to the higher $CO_2$ partial pressure.

Swing Adsorber Processes—Overview

Pressure swing adsorption (PSA) relies on swinging or cycling pressure over a bed of adsorbent through a range of values. In PSA processes, a gaseous mixture is conducted under pressure for a period of time over a first bed of a solid sorbent that is selective, or relatively selective, for one or more components, usually regarded as a contaminant, to be removed from the gaseous mixture. For example, a feed can be introduced into a PSA apparatus at a feed pressure. At the feed pressure, one or more of the components (gases) in the feed can be selectively (or relatively selectively) (ad)sorbed, while one or more other components (gases) can pass through with lower or minimal adsorption. A component (gas) that is selectively (ad)sorbed can be referred to as a "heavy" component of a feed, while a gas that is not selectively (ad)sorbed can be referred to as a "light" component of a feed. For convenience, a reference to the "heavy" component of the feed can refer to all components (gases) that are selectively (ad)sorbed, unless otherwise specified. Similarly, a reference to the "light" component can refer to all components (gases) that are not selectively (ad)sorbed, unless otherwise specified. After a period of time, the feed flow into the PSA apparatus can be stopped. The feed flow can be stopped based on a predetermined schedule, based on detection of breakthrough of one or more heavy components, based on (ad)sorption of the heavy component(s) corresponding to at least a threshold percentage of the total capacity of the (ad)sorbent, or based on any other convenient criteria. The pressure in the reactor can then be reduced to a desorption pressure that can allow the selectively (ad)sorbed component(s) (gas(es)) to be released from the (ad)sorbent. Optionally, one or more purge gases can be used prior to, during, and/or after the reduction in pressure to facilitate release of the selectively (ad)sorbed component(s) (gas(es)). Depending on its nature, a full PSA cycle can optionally be performed at a roughly constant temperature. As PSA is usually enabled by at least adsorption and usually occurs on gaseous components, the terms "adsorption"/"adsorbent" and "gas(es)" are used as descriptors in the instant specification and claims, without intending to be limiting in scope, even though "absorption"/"absorbent"/"sorbent"/"sorption" and "component(s)" may be more generally applicable.

Multiple beds can be used to enable a complete cycle, where typically every bed sequentially goes through the same cycle. When a first PSA reactor satisfies a condition, such as the adsorbent in the reactor becoming sufficiently saturated, the feed flow can be switched to a second reactor. The first PSA reactor can then be regenerated by having the adsorbed gases released. To allow for a continuous feed flow, a sufficient number of PSA reactors and/or adsorbent beds can be used so that the first PSA reactor is finished regenerating prior to at least one other PSA reactor satisfying the condition for switching reactors.

Swing Adsorber Processes—Process Cycle

In various aspects, a PSA reactor can be used for performing a separation on a stream containing $CO_2$ and $N_2$. An example of such a stream can include the exhaust stream from a combustion reaction for providing power for a gas turbine. Preferably, the exhaust stream can be the exhaust from a combustion reaction performed with a substantially stoichiometric composition with regard to the amount of oxygen and fuel. Prior to use as a feed for separation by PSA, the exhaust stream can undergo further processing, such as condensation to remove water, combustion to remove excess fuel, adsorption for removal of $NO_x$ species, and/or other types of processing to remove components different from $CO_2$ and $N_2$. In some aspects, the portion of the exhaust stream used as the feed for the PSA reactor can have a water content of less than about 1.0 vol %, such as less than about 0.5 vol %. Additionally or alternately, the portion of the exhaust stream used as the feed for the PSA reactor can have an $O_2$ content of less than about 3.0 vol %, such as less than about 1.0 vol % or less than about 0.5 vol %. Further additionally or alternately, the feed into the PSA reactor can be substantially composed of $CO_2$ and $N_2$, where components of the input gas feed different from $CO_2$ and $N_2$ are present in an amount of about 1.0 vol % or less each, such as less than about 0.5 vol % each. Still further additionally or alternately, in a feed substantially composed of $CO_2$ and $N_2$, the combined vol % of components other than $CO_2$ and $N_2$ can be about 2.0 vol % or less, such as about 1.0 vol % or less or 0.5 vol % or less.

To perform a separation, a portion of the recycled exhaust stream can be introduced into a PSA reactor, such as a purge stream from the exhaust stream recycle loop. The portion of the recycled exhaust stream can be withdrawn from the exhaust recycle system at a location after the temperature and pressure of the recycled exhaust stream have been modified (and/or after desired temperature and pressure have been obtained) for use as part of the input gas flow to the combustion reaction. At such point in the recycle system, the exhaust stream can have a temperature from about 300° C. to about 600° C., e.g., from about 300° C. to about 550° C., from about 300° C. to about 500° C., from about 300° C. to about 450° C., from about 300° C. to about 400° C., from about 350° C. to about 600° C., from about 350° C. to about 550° C., from about 350° C. to about 500° C., from about 350° C. to about 450° C., from about 400° C. to about 600° C., from about 400° C. to about 550° C., from about 400° C. to about 500° C., from about 425° C. to about 600° C., from about 425° C. to about 550° C., from about 425° C. to about 500° C., from about 425° C. to about 460° C., from about 450° C. to about 600° C., from about 450° C. to about 550° C., from about 500° C. to about 600° C. Additionally or alternately, the temperature can be at least about 325° C., e.g., at least about 350° C., at least about 400° C., at least about 425° C., or at least about 440° C. Further additionally or alternately, the temperature can be about 575° C. or less, about 550° C. or less, about 500° C. or less, about 475° C. or less, about 460° C. or less, or about 440° C. or less. Still further additionally or alternately, the pressure of the recycled exhaust stream can be at least about 10 bara (about 1.0 MPa), e.g., at least about 15 bara (about 1.5 MPa), at least about 20 bara (about 2.0 MPa), at least about 25 bara (about 2.5 MPa), or at least about 30 bara (about 3.0 MPa). Yet further additionally or alternately, the pressure can be about 60 bara (6.0 MPa) or less, e.g., about 50 bara (about 5.0 MPa) or less, about 40 bara (about 4.0 MPa) or less, about 35 bara (about 3.5 MPa) or less, about 30 bara (about 3.0 MPa) or less, about 25 bara (about 2.5 MPa) or less, or about 22.5 bara (about 2.25 MPa) or less. In some alternative aspects, other locations for withdrawing the portion of the recycled exhaust stream can be selected, so long as the withdrawn portion has similar temperature and pressure values.

In some aspects, the recycled exhaust stream can be introduced into the PSA reactor at a separation temperature and a separation pressure that can correspond to the temperature and pressure of the recycle stream. However, some variation in temperature and/or pressure may occur between withdrawal of the portion of the recycled exhaust stream from the recycle system and introduction of the recycled exhaust stream into the PSA reactor. For example, the separation temperature for the portion of the recycled exhaust stream introduced into the PSA reactor can differ from the temperature in the recycle system by about 20° C. or less, e.g., by about 15° C. or less or by about 10° C. or less. It is noted that, although having the same temperature for the separation temperature and the temperature in the recycle stream (i.e., a difference of approximately 0° C.) is included within the enumerated differences, in some rare embodiments the temperature differences can optionally exclude 0° C. Additionally or alternately, the separation pressure for the portion of the recycled exhaust stream introduced into the PSA reactor can differ from the pressure in the recycle system by about 5 bar (0.5 MPa) or less, e.g., about 2 bara (0.2 MPa) or less, about 1 bara (about 0.1 MPa) or less, or about 0.5 bar (about 50 kPa) or less.

When the exhaust stream is introduced into the PSA reactor, the $N_2$ in the exhaust stream corresponds to a "light" component while the $CO_2$ corresponds to a "heavy" component. Thus, the $N_2$ can primarily pass through the reactor while the $CO_2$ can be selectively adsorbed within the reactor. The adsorption of $CO_2$ from the feed can result in a product $N_2$ stream. The feed can be passed through the PSA reactor until one or more pre-defined criteria is satisfied for switching the feed to another PSA reactor or otherwise stopping the flow of feed gas. Any convenient pre-defined criteria can be used. For example, the feed can be passed through the reactor for a specified time period. Additionally or alternately, the feed can be passed into the reactor until a breakthrough amount of $CO_2$ is detected in the product $N_2$ stream. Further additionally or alternately, the feed can be passed into the reactor until the amount of $CO_2$ that has entered the reactor is approximately equal to a threshold value of the adsorbent capacity of the reactor. In such a situation, for example, the feed can be passed into the reactor until the amount of $CO_2$ that has entered the reactor is equal to at least about 75% of the adsorbent capacity of the adsorbent material in the reactor, such as at least about 80%, at least about 85%, or at least about 90%. A typical PSA cycle can involve introducing feed into the reactor for about 30 seconds to about 300 seconds, e.g., for about 60 seconds to about 120 seconds.

The product $N_2$ stream can have a purity of at least about 85 vol %, e.g., at least about 88 vol %, at least about 90 vol %, at least about 92 vol %, at least about 93 vol %, at least about 94 vol %, at least about 95 vol %, at least about 96 vol %, at least about 97 vol %, or at least about 98 vol %. After optional removal of water, the product $N_2$ stream can have a purity of at least about 90 vol %, e.g., at least about 95 vol %, at least about 97 vol %, at least about 98 vol %, or at least 99 vol %. The pressure of the $N_2$ stream can be at least about 90%, e.g., at least about 95%, of the pressure of the recycled exhaust used as the input to the PSA reactor. Additionally or alternately, the pressure of the $N_2$ stream can differ from the separation pressure by less than about 0.5 bar (about 50 kPa), e.g., less than about 0.3 bar (about 30 kPa) or less than about 0.1 bar (about 10 kPa). Further additionally or alternately, the separation temperature for the portion of the recycled exhaust stream introduced into the PSA reactor can differ from the temperature of the $N_2$ product stream by about 20° C. or less, e.g., by about 15° C. or less or by about 10° C. or less. It is noted that, although having the same temperature for the separation temperature and the temperature in the recycle stream (i.e., a difference of approximately 0° C.) is included within the enumerated differences, in some rare embodiments the temperature differences can optionally exclude 0° C. Additionally or alternately, the temperature of the $N_2$ product stream can be at least the temperature of the PSA reactor (the adsorption temperature) during the adsorption portion of the separation cycle.

After the feed is stopped, the pressure in the PSA reactor can be reduced, e.g., using one or more blow down processes. In a blow down process, one or both sides of a PSA reactor can be opened to allow pressure to release in the form of a blow down gas stream. The blow down gas stream can generally include a majority portion of $N_2$ and can also typically include some $CO_2$. The amount of adsorbed $CO_2$ released in the blow down process(es) can depend on the nature of the adsorbent. In some conventional PSA reactors, the blow down gas stream can be exhausted from the feed input side of the reactor. Alternatively, one or more blow down gas streams can be exhausted from the product side of the reactor. For example, one option can include having an initial blow down process exiting from the product side of the reactor followed by a second blow down process allowing a gas stream to exit from both sides of the reactor. The blow down process(es) can reduce the pressure in the reactor to a value from about 0.9 bara (about 90 kPa) to about 3.0 bara (about 0.3 MPa), e.g., from about 1.0 bara (about 0.1 MPa) to about 3.0 bara (about 0.3 MPa), from about 1.1 bara (about 110 kPa) to about 3.0 bara (about 0.3 MPa), from about 1.3 bara (about 130 kPa) to about 3.0 bara (about 0.3 MPa), from about 0.9 bara (about 90 kPa) to about 2.6 bara (about 260 kPa), from about 1.0 bara (about 0.1 MPa) to about 2.6 bara (about 260 kPa), from about 1.1 bara (about 110 kPa) to about 2.6 bara (about 260 kPa), from about 1.3 bara (about 130 kPa) to about 2.6 bara (about 260 kPa), from about 0.9 bara (about 90 kPa) to about 2.0 bara (about 0.2 MPa), from about 1.0 bara (about 0.1 MPa) to about 2.0 bara (about 0.2 MPa), from about 1.1 bara (about 110 kPa) to about 2.0 bara (about 0.2 MPa), or from about 1.3 bara (about 130 kPa) to about 2.0 bara (about 0.2 MPa). In many embodiments, maintaining a pressure above atmospheric pressure in the reactor can assist with the adsorbent retaining $CO_2$ until a subsequent purge step when desorption is desired. In some embodiments, the length of time for the blow down processes can be from about 30 seconds to about 120 seconds.

In some aspects, the use of multiple blow down steps can be desirable for creating blow down streams that are easier to subsequently process. For example, during adsorption of $CO_2$ from an exhaust gas, a profile can typically develop in the reactor, with a higher content of non-adsorbed $CO_2$ near the back (input) end of the reactor and a lower content of $CO_2$ near the exit (front) end of the reactor. Based on this profile, a partial blow down from only the exit (front) end of the reactor can be used to produce a blow down output with a low $CO_2$ content. This initial blow down step can result in the higher $CO_2$ content near the back (input) end of the reactor being distributed more evenly throughout the reactor. As this occurs, it can then be more efficient to allow blow down output streams to exit from both ends of the reactor until the desired lower pressure can be achieved.

Preferably, a buffer gas is not introduced into the reactor during the time between stopping the flow of exhaust gas and starting the blow down process step(s). It can additionally or alternately be preferred that the blow down process step(s) can be performed without introducing an additional gas into the reactor. Avoiding the use of buffer gases and/or additional gases in the blow down steps can be desirable, because introduction of such gases after the flow of exhaust gas is stopped can typically result in further loss of value into a low value stream. For example, the output flows generated by the blow down step(s) are, by definition, lower pressure output flows relative to the product $N_2$ flow generated during the separation of the exhaust gas. Thus, the $N_2$ in the blow down output has typically lost much of its value from a power generation standpoint. Prior to further use, the $N_2$ in the blow down output flow can likely need to be recompressed. Adding additional $N_2$ after the flow of exhaust gas is stopped can typically only increase the amount of $N_2$ in this low value output flow. The blow down output flow can preferably be relatively low in $CO_2$, as it can generally be desirable to retain as much $CO_2$ as possible until the start of the subsequent purge step(s). Any $CO_2$ that exits the PSA reactor as part of a blow down stream represents additional $CO_2$ in a stream other than the desired $CO_2$ product stream. This additional $CO_2$, which can typically be in low concentration, can then need to be separately handled if it is desired to achieve as high an amount of carbon capture and recovery as possible. Thus, adding additional $CO_2$ here is also not typically desirable. Finally, adding a third gas different from $CO_2$, $N_2$, or $H_2O$ may not be desirable, as introduction of such a gas can likely result in another component requiring separation.

After the blow down process(es), one or more purge gas flows can be used to remove the adsorbed $CO_2$ from the reactor. One option can include using a steam purge at a pressure from about 1.0 bara (about 0.1 MPa) to about 3.0 bara (about 0.3 MPa), e.g., from about 1.1 bara (about 110 kPa) to about 3.0 bara (about 0.3 MPa), from about 1.3 bara (about 130 kPa) to about 3.0 bara (about 0.3 MPa), from about 1.0 bara (about 0.1 MPa) to about 2.6 bara (about 260 kPa), from about 1.1 bara (about 110 kPa) to about 2.6 bara (about 260 kPa), from about 1.3 bara (about 130 kPa) to about 2.6 bara (about 260 kPa), from about 1.0 bara (about 0.1 MPa) to about 2.0 bara (about 0.2 MPa), from about 1.1 bara (about 110 kPa) to about 2.0 bara (about 0.2 MPa), or from about 1.3 bara (about 130 kPa) to about 2.0 bara (about 0.2 MPa), to assist in desorbing the $CO_2$. An alternative option can include using a steam purge at a pressure above 3.0 bara (0.3 MPa), e.g., of at least 4.0 bara (0.4 MPa), of at least 5.0 bara (0.5 MPa), from above 3.0 bara (0.3 MPa) to about 20 bara (about 2 MPa), from above 3.0 bara (0.3 MPa) to about 15 bara (about 1.5 MPa), from above 3.0 bara (0.3 MPa) to about 10 bara (about 1 MPa), from above 3.0 bara (0.3 MPa) to about 8 bara (about 0.8 MPa), from above 3.0 bara (0.3 MPa) to about 6 bara (about 0.6 MPa), from above 3.0 bara (0.3 MPa) to about 5 bara (about 0.5 MPa), from 4.0 bara (0.4 MPa) to about 20 bara (about 2 MPa), from 4.0 bara (0.4 MPa) to about 15 bara (about 1.5 MPa), from 4.0 bara (0.4 MPa) to about 10 bara (about 1 MPa), from 4.0 bara (0.4 MPa) to about 8 bara (about 0.8 MPa), from 4.0 bara (0.4 MPa) to about 6 bara (about 0.6 MPa), from 4.0 bara (0.4 MPa) to about 5 bara (about 0.5 MPa), from 5.0 bara (0.5 MPa) to about 20 bara (about 2 MPa), from 5.0 bara (0.5 MPa) to about 15 bara (about 1.5 MPa), from 5.0 bara (0.5 MPa) to about 10 bara (about 1 MPa), from 5.0 bara (0.5 MPa) to about 8 bara (about 0.8 MPa), or from 5.0 bara (0.5 MPa) to about 6 bara (about 0.6 MPa). The steam purge can result in a product $CO_2$ output stream that can also include $H_2O$ and a lesser amount of $N_2$. In some embodiments, the steam purge can last for about 25 seconds to about 60 seconds. After removal of water, the product $CO_2$ stream can have a purity of at least about 60%, e.g., at least about 65%, at least about 70%, at least about 75%, at least about 80%, at least about 85 vol %, at least about 90 vol %, at least about 92 vol %, at least about 94 vol %, at least about 95 vol %, at least about 96%, at least about 97%, at least about 98%, at least about 99%, at least about 99.3%, or at least about 99.5%. Additionally or alternately, the amount of $CO_2$ recovered can correspond to at least about 80 vol %, e.g., at least about 85 vol %, at least about 90 vol %, at least about 92 vol %, at least about 94 vol %, at least about 95 vol %, at least about 96%, at least about 97%, at least about 98%, at least about 99%, at least about 99.3%, or at least about 99.5%.

The amount of steam used in the steam purge can correspond to about 1.0 moles of water or less per mole of $CO_2$ in the feed, e.g., about 0.9 moles of water or less per mole of $CO_2$ in the feed, about 0.75 moles of water or less per mole of $CO_2$ in the feed, about 0.6 moles of water or less per mole of $CO_2$ in the feed, about 0.5 moles of water or less per mole of $CO_2$ in the feed, or about 0.4 moles of water or less per mole of $CO_2$ in the feed. Using less steam in the purge can be beneficial, because the amount of steam used can typically correspond to the amount of energy used for the $CO_2$ recovery. It is noted that the feed can typically contain at least 50 mol %, and often at least 75 mol %, of $N_2$. Thus, a comparison of the number of moles of water per total moles of gas (including both $N_2$ and $CO_2$) in the feed could produce still lower values, e.g., about 0.5 moles of water or less per mole of gas in the feed, about 0.4 moles of water or less per mole of gas in the feed, about 0.3 moles of water or less per mole of gas in the feed, about 0.25 moles of water or less per mole of gas in the feed, about 0.2 moles of water or less per mole of gas in the feed, about 0.15 moles of water or less per mole of gas in the feed, or about 0.1 moles of water or less per mole of gas in the feed. In such embodiments where there is a non-zero amount of steam used in the steam purge, the molar ratio of steam can be at least about 0.05 moles of water or less per mole of $CO_2$ in the feed (e.g., at least about 0.1 moles of water or less per mole of $CO_2$ in the feed, at least about 0.2 moles of water or less per mole of $CO_2$ in the feed, or at least about 0.3 moles of water or less per mole of $CO_2$ in the feed) and/or can be at least about 0.01 moles of water or less per mole of gas in the feed (e.g., at least about 0.02 moles of water or less per mole of gas in the feed, at least about 0.05 moles of water or less per mole of gas in the feed, or at least about 0.1 moles of water or less per mole of gas in the feed).

After the steam purge, a second nitrogen purge can optionally be used to remove water and any remaining $CO_2$ from the reactor. If the second purge is not used, the $N_2$ output stream in the next cycle may have higher water content, but otherwise the additional water is not believed to significantly impact the separation process. When a second nitrogen purge is used, it can be performed for about 10 seconds to about 45 seconds. After the steam purge and the optional second nitrogen purge, the reactor can then be repressurized to start the next separation cycle. The repressurization can be performed using the input feed (the recycled exhaust gas). Alternatively but preferably, a second purge, such as a second nitrogen purge, may not be performed, as such a second purge can represent a flow of buffer gas between the end of a purge step and the start of the next cycle of introducing exhaust gas for separation of $N_2$ and $CO_2$. For the reasons noted above, additional buffer gas steps can typically be undesirable, as such buffer steps can tend to result in additional volume for low value gas streams.

In an alternative embodiment, no steam is intentionally used as a purge gas in the desorption step of the PSA cycle. In such an alternative embodiment, if a purge gas is used at all, it would not intentionally include water but, for instance, could include a nitrogen purge (e.g., which can last for about 10 seconds to about 60 seconds, for about 10 seconds to about 50 seconds, for about 10 seconds to about 45 seconds, for about 15 seconds to about 60 seconds, for about 15 seconds to about 50 seconds, for about 15 seconds to about 45 seconds, for about 20 seconds to about 60 seconds, for about 20 seconds to about 50 seconds, for about 20 seconds to about 45 seconds, for about 25 seconds to about 60 seconds, for about 25 seconds to about 50 seconds, or for about 25 seconds to about 45 seconds). It should be understood that, even in such embodiments where no steam is intentionally added, some water/steam may nevertheless be present as an impurity/contaminant in any purge stream that is used. In such alternative embodiments, the use of no intentionally added steam can allow the $CO_2$ from the PSA process to be introduced directly into $CO_2$ compressors, e.g., for well injection in enhanced oil recovery processes, without the need for intermediate equipment such as condensers or heat exchangers. Similar recoveries and/or purities of $CO_2$ can be achieved in this alternative embodiment, though obviously water need not be removed to attain those recoveries and/or purities in such an embodiment.

An additional/alternate way of characterizing the desire to reduce/minimize the use of buffer gases can be by characterizing the total gas input flows into the PSA reactor during a process cycle. In the process described above, a full cycle of the process can correspond to passing an initial gas flow into the reactor for separation, adsorbing $CO_2$ from the input gas flow, recovering an $N_2$ product stream, blowing down the pressure in the reactor, and purging the reactor with steam, optionally including a second purge stream. If only a steam purge is used, the primary input gas flows into the PSA reactor during a process cycle can include the input gas flow of recycled exhaust gas and the steam purge. Preferably, these primary input flows can correspond to at least about 90 vol % of all gas flows into the PSA reactor, e.g., at least about 95 vol %, at least about 98 vol %, or at least about 99 vol %. If a second purge of $N_2$ or another second purge gas is used, then the primary input gas flows into the PSA reactor during a process cycle can include the input gas flow of recycled exhaust gas, the steam purge, and the second purge. Preferably, in such an embodiment, these primary input flows can correspond to at least about 90 vol % of all gas flows into the PSA reactor, e.g., at least about 95 vol %, at least about 98 vol %, or at least about 99 vol %.

Figure 2:
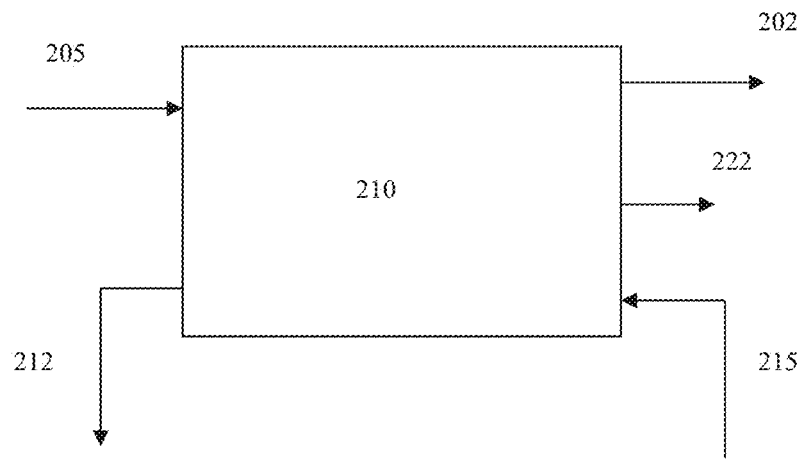
FIG. 2 schematically shows a configuration for a pressure swing adsorption process.

FIG. 2 schematically shows an example of the gas flows into and out of a pressure swing adsorption unit suitable for use in separating an exhaust gas containing $CO_2$ and $N_2$. In FIG. 2, a pressure swing adsorption reactor 210 can receive a feed 205 containing $CO_2$ and $N_2$ for separation from a first or back side of the reactor. An $N_2$ product stream 202 can emerge from a second or forward side of the reactor. After a period of time, such as after breakthrough of the $CO_2$, the feed to the PSA can be stopped. One or more blow down processes can then be performed to reduce the pressure in the reactor. In FIG. 2, a forward blow down output 222 is shown. Optionally, either a back blow down or both a back and a forward blow down can be used in place of a forward blow down 222. A purge stream such as a steam purge 215 can then be introduced into the forward side of the reactor. The purge stream can assist in desorbing $CO_2$ from the adsorbent to produce the $CO_2$ product stream 212.

Though not specifically delineated in any of the Figures herein, the purified $CO_2$ output of the PSA process can be used in applications to recover oil, gas, or associated hydrocarbons from surface and/or subterranean deposits (e.g., conventional downhole oil/natural gas reservoirs, unconventional reservoirs/wells, shale oil deposits, shale gas deposits, tight gas sands, stranded gas deposits, fracking deposits, and the like). In many of these embodiments, relatively high $CO_2$ purities may be desirable, e.g., to increase efficiency and reduce costs associated with compressing impurities. Nevertheless, in certain of these embodiments, at least some part of enhanced oil/gas/hydrocarbon recovery can efficiently utilize lower $CO_2$ purities (e.g., from about 60% to about 85% or from about 60% to about 80%), and particularly can offer a distinct benefit from methods according to the invention that allow (increased) flexibility in $CO_2$ stream purity (e.g., a staged flood, wherein a sequence of different purities are used). Such flexible purity control can be aligned with a particular deposit/reservoir that can age over time and/or with the quality of a particular deposit.

Swing Adsorber Processes—Reactor Configuration

Beds of adsorbent can be arranged in any convenient manner to provide a flow path for gas, including axial and/or radial flow directions. The vessels holding the bed of adsorbent can be oriented with respect to flow direction in any convenient manner. One typical orientation for a PSA reactor can be to have a reactor where the direction of flow is aligned with the long or primary axis of the reactor. An example of this includes having PSA reactors in the form of vertical cylinders, where the input gas flow enters the cylinder through the top or bottom surface. While this can represent a conventional configuration for a PSA reactor relative to the direction of gas flow, scaling up a process to handle large flow volumes can pose difficulties. For example, a typical length to diameter ratio for a PSA reactor can be about 3 to 1, such as a reactor with a length of about 10 meters and a diameter of about 3 meters. Increasing the size of such a reactor can generally result in an increasing pressure drop across the reactor, which is typically not desirable. Thus, in order to scale up axial flow PSA reactors to handle large gas flows, multiple reactors can typically be used.

Additionally or alternately, a PSA reactor can be used where the long or primary axis of the reactor can be perpendicular to the direction of gas flow. For example, a PSA reactor can include parallel plates of adsorbent with the long axis of the parallel plates being perpendicular to the direction of gas flow. This can allow a much larger volume of adsorbent for capturing $CO_2$ to be placed in a single reactor with an axial flow orientation while reducing the distance the gas flow must travel to cross the reactor. As a result, this type of configuration can reduce the pressure drop across a PSA reactor while still handling large volumes of input gas flow. This can reduce the number of separate reactors required to handle a large flow.

As an example, a horizontally oriented PSA reactor can have parallel plates of adsorbent of approximately rectangular shape, e.g., with a long axis of about 30 meters and a short axis of about 4 meters. In the horizontal configuration, the input gas can be introduced to flow across the short axis. This can be accomplished by introducing the input gas at several locations along a side of the reactor corresponding to the long axis. Flow distributors can then be used inside the PSA reactor so that the input gas can be distributed along the entire length of the long axis. For large gas flow rates, the pressure drop from distributing the feed across the long axis of a PSA reactor can be lower than attempting to force such a large gas flow rate through a plurality of conventional axial flow PSA reactors.

Swing Adsorber Processes—Adsorbent Materials

In various aspects, a swing adsorption process can be performed to separate $N_2$ from $CO_2$ at a temperature and pressure beneficial for other aspects of the combined power generation process. For example, the recycled exhaust gas can have a temperature from about 300° C. to about 600° C. (e.g., from about 300° C. to about 550° C., from about 300° C. to about 500° C., from about 300° C. to about 450° C., from about 300° C. to about 400° C., from about 350° C. to about 600° C., from about 350° C. to about 550° C., from about 350° C. to about 500° C., from about 350° C. to about 450° C., from about 400° C. to about 600° C., from about 400° C. to about 550° C., from about 400° C. to about 500° C., from about 425° C. to about 600° C., from about 425° C. to about 550° C., from about 425° C. to about 500° C., from about 425° C. to about 460° C., from about 450° C. to about 600° C., from about 450° C. to about 550° C., or from about 500° C. to about 600° C.; additionally or alternately, the temperature can be at least about 325° C., e.g., at least about 350° C., at least about 400° C., at least about 425° C., or at least about 440° C.; further additionally or alternately, the temperature can be about 575° C. or less, about 550° C. or less, about 500° C. or less, about 475° C. or less, about 460° C. or less, or about 440° C. or less) and a pressure from about 10 bara (about 1.0 MPa) to about 60 bara (about 6.0 MPa) (e.g., a pressure of at least about 10 bara (about 1.0 MPa), at least about 15 bara (about 1.5 MPa), at least about 20 bara (about 2.0 MPa), at least about 25 bara (about 2.5 MPa), or at least about 30 bara (about 3.0 MPa) and/or a pressure of about 60 bara (6.0 MPa) or less, about 50 bara (about 5.0 MPa) or less, about 40 bara (about 4.0 MPa) or less, about 35 bara (about 3.5 MPa) or less, about 30 bara (about 3.0 MPa) or less, about 25 bara (about 2.5 MPa) or less, or about 22.5 bara (about 2.25 MPa) or less).

As noted above, one goal of the separation process can be to perform the separation under conditions compatible with the power generation process. Thus, it can be desirable to perform the separation at approximately the temperature and pressure of the recycled exhaust gas. In order to accomplish a separation at the conditions of the recycled exhaust gas, the adsorbent material in the pressure swing adsorber reactor should generally be effective under such conditions.

One example of a suitable adsorbent includes a mixed metal oxide adsorbent, such as an adsorbent including a mixture of an alkali metal carbonate and an alkaline earth metal oxide and/or a transition metal oxide. Examples of suitable alkali metal carbonates can include, but are not limited to, a carbonate of lithium, sodium, potassium, rubidium, cesium, or a combination thereof, e.g., a carbonate of lithium, sodium, potassium, or a combination thereof. Examples of suitable alkaline earth metal oxides can include, but are not limited to, oxides of magnesium, calcium, strontium, barium, or a combination thereof, e.g., oxides of magnesium and/or calcium. Some examples of suitable transition metal oxides can include, but are not limited to, oxides of lanthanide series metals, such as lanthanum, and/or of transition metals that can form oxides with the metal in a +2 or +3 oxidation state (such as yttrium, iron, zinc, nickel, vanadium, zirconium, cobalt, or a combination thereof).

In some aspects, the carbonate can be selected independently from the oxide in the mixed metal oxide. In such aspects, the carbonate can include, consist essentially of, or be lithium carbonate, sodium carbonate, potassium carbonate, rubidium carbonate, and/or cesium carbonate (e.g., lithium carbonate, sodium carbonate, and/or potassium carbonate; lithium carbonate and/or potassium carbonate; lithium carbonate and/or sodium carbonate; or sodium carbonate and/or potassium carbonate).

In aspects where the carbonate is selected independently from the oxide, the oxide can be an alkaline earth oxide, a transition metal oxide, a combination of two or more alkaline earth oxides, a combination of two or more transition metal oxides, or a combination of oxides including at least one alkaline earth oxide and at least one transition metal oxide. In aspects where the independently selected oxide includes one or more alkaline earth oxides, a suitable alkaline earth oxide can include, consist essentially of, or be magnesium oxide, calcium oxide, strontium oxide, and/or barium oxide, e.g., including at least magnesium oxide and/or calcium oxide.

In aspects where the independently selected oxide includes one or more transition metal oxides, suitable transition metals can include, consist essentially of, or be one or more transition metals that can form oxides with the metal in a +2 or +3 oxidation state (e.g., yttrium oxide, iron oxide, zinc oxide, nickel oxide, vanadium oxide, cobalt oxide, zirconium oxide, lanthanum oxide, other oxides of lanthanide metals, and/or a combination thereof). One preferred option includes a transition metal oxide selected from lanthanum oxide and/or zirconium oxide. Another option includes a metal oxide selected from lanthanum oxide, yttrium oxide, zirconium oxide, and/or zinc oxide. Yet another option includes a metal oxide selected from nickel oxide, cobalt oxide, and/or iron oxide. Mixtures within each of these options and/or across options are also contemplated, such as mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and mixtures of zirconium oxide with iron oxide, cobalt oxide, and/or nickel oxide.

In aspects where the independently selected oxide includes one or more alkali metal oxides and one or more transition metal oxides, suitable alkali metal oxides can include, consist essentially of, or be magnesium oxide, calcium oxide, strontium oxide, and/or barium oxide, while suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, and/or other lanthanide oxides. Each of these alkali metal oxides and transition metal oxides can be independently selected individually or in any combination of multiple transition metal oxides. Examples of mixtures can include, consist essentially of, or be a mixture of oxides where at least one oxide is lanthanum oxide, zirconium oxide, and/or magnesium oxide; a mixture of oxides where the mixture includes at least two of lanthanum oxide, zirconium oxide, and magnesium oxide; a mixture of oxides where one oxide is magnesium oxide and/or calcium oxide; and/or a mixture of oxides where at least one oxide is lanthanum oxide, yttrium oxide, and/or zirconium oxide.

In some alternative aspects, a mixed metal oxide can include an alkaline earth carbonate in combination with a transition metal oxide. In such aspects, the alkaline earth carbonate can include, consist essentially of, or be magnesium carbonate and/or calcium carbonate. Additionally or alternately, the alkaline earth carbonate can be present in a mixture with an alkali metal carbonate. Examples of such carbonate mixtures can include, consist essentially of, or be mixtures of lithium carbonate with magnesium carbonate, lithium carbonate with calcium carbonate, potassium carbonate with magnesium carbonate, potassium carbonate with calcium carbonate, sodium carbonate with magnesium carbonate, and sodium carbonate with calcium carbonate (e.g., lithium carbonate with magnesium carbonate or potassium carbonate with magnesium carbonate). In such aspects, suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, other lanthanide oxides, and/or a combination thereof. Each of these alkaline earth carbonates and transition metal oxides can be independently selected individually or in any combination of multiple alkaline earth carbonates and/or multiple transition metal oxides. For the transition metal oxide, one preferred option can include a transition metal oxide selected from lanthanum oxide or zirconium oxide. Another option can include a metal oxide selected from lanthanum oxide, yttrium oxide, zirconium oxide, and/or zinc oxide. Yet another option can include a metal oxide selected from nickel oxide, cobalt oxide, and/or iron oxide. Mixtures within each of these options and/or across options are also contemplated, such as mixtures of oxides where at least one oxide is lanthanum oxide and/or zirconium oxide; mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and/or mixtures of zirconium oxide with iron oxide, cobalt oxide, and/or nickel oxide.

Additional or alternative materials can include hydrotalcites.

Several examples of pressure swing adsorption are described below.

EXAMPLE 1

Performing Pressure Swing Adsorption on a Portion of Recycled Exhaust

The following predictive example is based on a configuration for a pressure swing adsorption reactor similar to the configuration shown in FIG. 2. In this example, a mixed-metal oxide based adsorbent is used in a plurality of PSA reactors to separate $CO_2$ and $N_2$. The separation is performed at a temperature between about 400° C. and about 500° C. The PSA reactors correspond to multiple horizontally aligned vessels, such as 3 or 4 vessels. The reactors include an adsorbent configuration suitable for use in a horizontal alignment for input flow perpendicular to the long axis of the reactor, such as parallel plate adsorbents. The reactor vessels have about a 7.5 to 1 length to width ratio, corresponding to a long axis of about 30 meters and a short axis of about 4 meters. The reactors are deployed in a cycle which includes a sequence of steps. The first step in the cycle is a feed step at high pressure, such as ~21 bara (about 2.1 MPaa), for ~60-120 seconds during which feed gas is supplied to a feed end of a PSA reactor vessel. An example of a feed gas is the recycled turbine exhaust gas from a low emission power generation system. The turbine exhaust gas can be delivered to the PSA vessel at a temperature of ~440° C. An example of a turbine exhaust gas composition can be about 11 vol % carbon dioxide, about 84 vol % nitrogen, and a remaining amount of water and other trace species. As the fed gas is supplied to a feed end of the vessel, a nitrogen product is produced from a product side. The nitrogen product can have a purity of at least about 90 vol %, a temperature of about 440° C., and a pressure of about 20.7 bara (about 2.07 MPaa). After a sufficient amount of $CO_2$ is adsorbed, such as about 85% of the capacity of the adsorbent, a blow down step is started. The blow down step can be performed for about 30-120 seconds. At the end of the blow down step, the reactor vessel is at a pressure of about 1.3 bara (about 130 kPaa) to about 1.6 bara (about 160 kPaa). The blowdown can be performed either solely in the forward direction where only the product end is opened, or a first blowdown in the forward direction can be performed followed by a second blowdown where both feed and product ends are opened. After the blow down, a low pressure steam purge from the product side can be performed for about 35-135 seconds to sweep out adsorbed carbon dioxide. The low pressure steam purge generates an output stream containing water and carbon dioxide. After removal of water, the output stream can have a $CO_2$ purity of at least about 90 vol %. The output stream can also correspond to at least about 90% (by weight) of the $CO_2$ present in the feed to the PSA reactor. Optionally, an additional nitrogen purge can be performed after the steam purge, in order to sweep out any steam and carbon dioxide remaining in the reactor. The vessel is then repressurized from the feed side to return the PSA reactor vessel to the initial pressure for performing the separation of the feed gas. The repressurization can be performed using the feed gas and can typically take about 25-60 seconds. The conduct of this PSA cycle can allow separation of carbon dioxide from nitrogen contained in a turbine exhaust gas, such as a recycled exhaust gas, such that carbon dioxide is recovered at a rate of at least 90% and with a purity of at least 90 vol % (after condensing out water) while also simultaneously producing nitrogen at greater than 90 vol % purity. The cycle can also use a reduced amount of steam, such as from about 0.3 to about 0.6 mol steam per mol of carbon dioxide in the feed gas to the PSA reactor.

EXAMPLE 2

Simulations of Separation of a Turbine Exhaust Gas

The following example is based on simulations of separating $CO_2$ from $N_2$ in a flue gas or exhaust gas from a turbine for power generation. The simulations were based on numerical solution of the transient material and energy balances involved in a cyclic adsorption/desorption process. The reactor configuration corresponded to the configuration shown in FIG. 2.

Table 1 shows the inputs and results from the simulation. The simulated flow of exhaust gas was about 820 million SCF/day. The columns corresponded to various steps in a pressure swing adsorption cycle using a mixed-metal oxide based adsorbent containing potassium carbonate and lanthanum oxide. The "Feed" and "Steam Purge" columns corresponded to inputs into the process, while the remaining columns corresponded to output flows.

TABLE 1

|  | Feed | Steam Purge | $N_2$ Product | $CO_2$ product | Blow Down |
|---|---|---|---|---|---|
| P (bara) | 21 | 1.5 | 20.7 | 1.35 | 1.35 |
| T (° F.) | 826 | 826 | 837 | 824 | 837 |
| MMSCFD | 822 | 81.3 | 653 | 158 | 91.4 |
| lb · mol/hr | 90200 | 8930 | 71800 | 17400 | 10000 |
| $CO_2$ mol % | 11 | 0 | 0.39 | 51.5 | 5.69 |
| $N_2$ mol % | 84 | 0 | 93.3 | 1.69 | 89.0 |
| $H_2O$ mol % | 5 | 100 | 6.33 | 46.78 | 5.30 |

Table 2 shows the inputs and results from another simulation. The simulated flow of exhaust gas was about 830 million SCF/day. The columns corresponded to various steps in a pressure swing adsorption cycle using a mixed-metal oxide based adsorbent containing potassium carbonate and magnesium oxide. The "Feed" and "Steam Purge" columns corresponded to inputs into the process, while the remaining columns corresponded to output flows.

TABLE 2

|  | Feed | Steam Purge | $N_2$ Product | $CO_2$ product | Blow Down |
|---|---|---|---|---|---|
| P (bara) | 21 | 1.5 | 20.5 | 1.37 | 1.37 |
| T (° F.) | 826 | 826 | 840 | 820 | 840 |
| MMSCFD | 834 | 33.5 | 708 | 116 | 43.3 |
| lb · mol/hr | 91500 | 3680 | 77700 | 12700 | 4750 |
| $CO_2$ mol % | 11.0 | 0 | 0.72 | 73.7 | 4.21 |
| $N_2$ mol % | 84.0 | 0 | 93.4 | 0.57 | 90.4 |
| $H_2O$ mol % | 5.00 | 100 | 5.89 | 25.8 | 5.38 |

Based on the simulations, at least 90% of the $CO_2$ in the feed was captured as part of the desired $CO_2$ product. In other words, less than 10% of the $CO_2$ in the feed was lost to either the $N_2$ product or the blow down stream. As shown in Tables 1 and 2, the purity of the $CO_2$ product stream was greater than 96%. Note that, since about half of the initial $CO_2$ product stream was water, after removal of the water, the $N_2$ represented a correspondingly greater percentage of the remaining $CO_2$ product stream.

EXAMPLE 3

Energy Requirements for $CO_2$ Separation

Use of pressure swing adsorption for separating $CO_2$ from an exhaust gas can provide advantages in comparison with conventional separation methods. Table 3 shows a comparison of estimates for total energy consumed while performing $CO_2$ separation using pressure swing adsorption versus two comparative amine separation processes.

TABLE 3

| Conditions | Sorption Pressure (kPa) | $P_{final}$ $CO_2$ (kPa) | $P_{final}$ $N_2$ (kPa) | Energy consumption (kJ/mol $CO_2$, estimated) |
|---|---|---|---|---|
| Low Pressure Amine (40° C.) | 101 | 101 | 101 | 18.2 |
| High Pressure Amine (40° C.) | 1919 | 101 | 1919 | 23.3 |
| Pressure Swing Adsorption (432° C.) | 1919 | 101 | 1919 | 19.1 |

In Table 3, the low pressure and high pressure amine processes refer to separation of $CO_2$ by adsorption in an amine separator. The amine separation was performed at a temperature of ~40° C. The sorption pressure refers to the pressure of the exhaust stream entering the separation process. The $P_{final}$ $CO_2$ value was constant and reflects the low pressure (such as ambient pressure) nature of the separated $CO_2$ stream. The $P_{final}$ $N_2$ value corresponds to the pressure of the $N_2$ stream generated by the process after separating out the $CO_2$. The energy consumption estimates were based on thermodynamic calculations for the various processes at the conditions indicated.

In Table 3, the energy required for $CO_2$ separation by pressure swing adsorption was lower than the energy required for high pressure amine treatment, and was comparable to the energy required for the low pressure amine treatment. However, as shown in Table 3, using pressure swing adsorption for $CO_2$ separation provided several advantages with regard to the properties of the $N_2$ stream generated during separation. First, the temperature of the $N_2$ product stream was roughly maintained during a pressure swing adsorption process, while the amine separation processes required a reduction in temperature, such as to ~40° C. In order to use the $N_2$ product stream for additional power generation, the temperature of the $N_2$ product streams from the amine processes would typically need to be raised back at least to about 300-400° C. or greater, which would require additional energy cost not included in the separation energy estimate shown in Table 3. The additional energy cost to return the $N_2$ product stream to a higher temperature can be mitigated by use of heat exchangers, so that then energy of the exhaust prior to separation could be transferred to the $N_2$ product stream after separation. However, this would require additional substantial equipment footprint, and therefore would be less desirable.

Another advantage of the pressure swing adsorption separation with respect to the low pressure amine separation can include the maintenance of the pressure of the $N_2$ product stream during the separation, which can allow the $N_2$ product stream to be used for other purposes, such as power generation, without having to expend energy to modify the stream.

EXAMPLE 4

Simulation of $CO_2$ Purity and Recovery for EOR Applications

Figure 3:
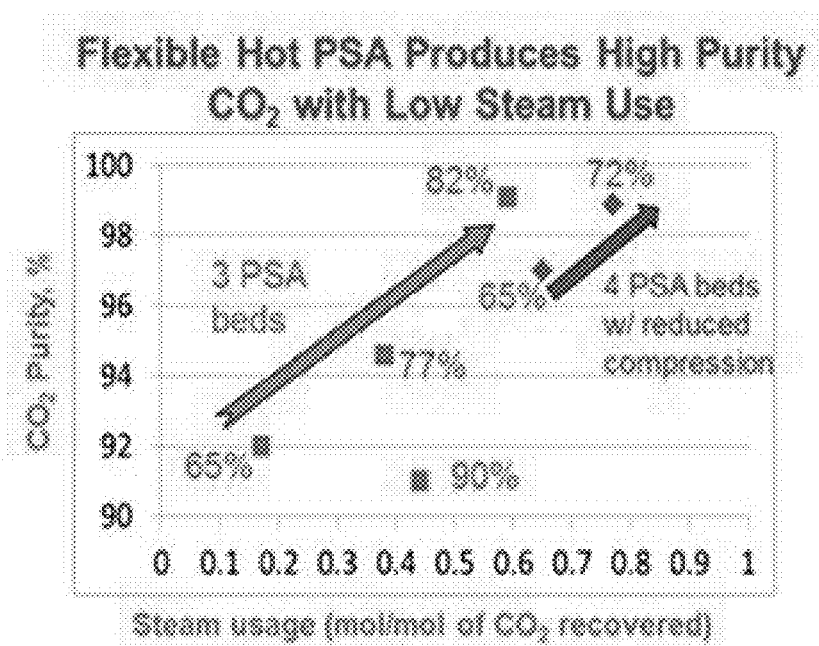
FIG. 3 shows a graph of $CO_2$ purity versus steam purge content for Example 4.

Using a configuration corresponding to FIG. 1 and conditions disclosed herein, a purified $CO_2$ gas stream (flue gas), e.g., from line 150 can have a pressure of about 21 bara (~2.1 MPa). FIG. 3 shows $CO_2$ recovery rates and $CO_2$ purity for a flue gas having this pressure. In situations where a higher gas pressure is desired, an additional compressor can be added between the outlet of exhaust gas recycle turbine and the PSA vessel.

FIG. 3 depicts integrated unit performance using a combination of numerical simulations and experimental data on key sorbent properties. Simulations were conducted based on a flue gas input to the PSA unit containing ~11 vol % $CO_2$, ~84 vol % $N_2$, ~5 vol % water at a temperature of at least 400° C., using a suitable high temperature adsorbent (e.g., a mixed-metal oxide and/or a hydrotalcite such as disclosed herein) with nominal flow of ~820 million SCFD (standard cubic feet per day). The simulations used herein relied on numerical solutions of the material and energy balances involved in adsorption and desorption process steps of the PSA cycle. The saturation $CO_2$ capacity for a sorbent was determined using standard thermogravimetric (TGA) and breakthrough column measurements.

FIG. 3 shows the trade-off between $CO_2$ purity versus steam use for the ULET power plant with ~21 bara emission gas pressure. The numbers shown at each data point of $CO_2$ purity are meant to correspond to the $CO_2$ recovery rate. FIG. 3 also shows a comparison between $CO_2$ purity, $CO_2$ capture rate, plant foot print, and steam usage.

All further uses of purified $CO_2$, e.g., enhanced hydrocarbon recovery, such as down-hole EOR, can typically require subsequent downstream compression to the required reservoir injection pressure or to the local $CO_2$ pipeline pressure (e.g., ~2215 psig, or ~150 bara). This pressure is specified for the US $CO_2$ pipeline network. The actual pressure required is a function of the reservoir and oil properties and could be much less than 2215 psig.

In order to reduce the downstream compression costs, one approach can be to regenerate $CO_2$ at elevated pressure (e.g., at ~2-3 bara). FIG. 3 shows that a 4-bed PSA process can deliver relatively high purity $CO_2$ (about 97% to about 99%) at a $CO_2$ capture rate while also maintaining relatively low steam usage (as measured by the ratio of moles of steam applied to moles of $CO_2$ generated, preferably not more than 1.0) at a relatively higher $CO_2$ pressure (again, ~2-3 bara or higher). It should be noted that the first stage of compression has the largest equipment footprint and thus the largest economic penalty, because of the very large volume of low pressure gas processed. Therefore, removing earlier stages of compression yields a much higher economic benefit than reducing the ultimate compression value (i.e., removing later stages of compression). Ultimate total compression for down-hole EOR applications can be above 100 bara, e.g., from about 100 bara to about 250 bara.

The benefits of the current invention, as evidenced by this Example, can be 2-fold—[1] there can be an overall reduction in equipment of (piping) accompanying reduced volumes of gas, which can be enabled by the elevated exhaust pressure; and [2] there can be a reduced compression power requirement resulting from eliminating the first (or more) stages of compression. The combined effect of the benefits can include a major footprint and energy advantage, which can be important for integrating power plants with enhanced hydrocarbon recovery facilities, particularly for conventional EOR.

In the case of lowered purity requirements (which may be suitable for certain reservoirs), the high temperature PSA can be operated without the use of an intentionally added steam purge. For example, a 3-bed high temperature PSA configuration operating at ~21 bar without steam can advantageously produce $CO_2$ at ~60% or higher both purity and recovery. Additionally or alternately, a 3 bed high temperature PSA configuration operating at ~55 bar can advantageously produce $CO_2$ at ~70% or higher purity, in the absence of intentionally added steam. Indeed, removing steam entirely can result in a significant reduction in process complexity, since various steam condensation, heat exchange, and corrosion related equipment can advantageously be eliminated in that scenario.

Furthermore, lower purity $CO_2$ may be suitable, or even desirable, for certain recovery operations, such as unconventional reservoirs, including those related to shale gas and rock formations, e.g., since increasing non-$CO_2$ "impurities" can lower the viscosity of the mixture to be injected into the reservoir, which can, in certain circumstances, allow improved absorption and/or subsequent improved hydrocarbon production. For instance, in a nominal reservoir at ~2000 psig and ~100° F., an 80/20 $CO_2/N_2$ gas stream can have a viscosity of ~0.03 cPs, while a 70/30 $CO_2/N_2$ gas stream can have a viscosity of ~0.025 cPs. Increased flexibility in varying $CO_2$ purity can, in certain circumstances, allow the methods and apparati according to the invention to have an increased production efficiency and/or to achieve an overall production of a deposit/reservoir not easily attainable without such flexibility.

For example, in the use of $CO_2$ for enhanced natural gas recovery from shale gas, the $CO_2$ purity in the recovery input stream may need to increase over time (continuously, stepwise, intermittently, gradually, or even dramatically) as more $CH_4$ gets produced, and there can be a greater need for $CO_2$ to displace $CH_4$, e.g., adsorbed on the organic matter in the reservoir rock. Therefore, the amount and/or purity of $CO_2$ required for injection can increase over time, as the content of $CH_4$ in the reservoir becomes reduced through continued production. This can result in a greater demand for $CO_2$ over time, in terms of larger volumes and/or in terms of purity, using the integrated methods according to the invention. In turn, in certain embodiments, this can require a higher steam usage in the PSA process, which variable steam demand can be enabled by the real-time adjustment capability described herein.

EXAMPLE 5

Performing PSA on a Portion of Recycled Exhaust for High Purity $CO_2$

The following prophetic example is based on a configuration for a pressure swing adsorption reactor similar to the configuration shown in FIG. 2. In this example, a mixed-metal oxide based adsorbent is used in a plurality of PSA reactors to separate $CO_2$ and $N_2$. The separation is performed at a temperature of about 440° C. The PSA reactors can correspond to ~3 horizontally aligned vessels. The reactors can include an adsorbent configuration suitable for use in a horizontal alignment for input flow perpendicular to the long axis of the reactor, such as parallel plate adsorbents and/or adsorbent bed(s). The reactor vessels can have a long axis of about 30 m and a short axis of about 4 m. The reactors can be deployed in a cycle including a sequence of steps. The first step in the cycle is a feed step at relatively high pressure, such as ~21 bara (~2.1 MPa), for about 150 seconds during which feed gas is supplied to a feed end of a PSA reactor vessel. An example of a feed gas can include or be the recycled turbine exhaust gas from a low emission power generation system. The turbine exhaust gas can be delivered to the PSA vessel at a temperature of about 440° C. An example of a turbine exhaust gas composition can be ~11 vol % $CO_2$, ~84 vol % $N_2$, and a remaining amount of water and other trace species. As the feed gas is supplied to a feed end of the vessel, a nitrogen product can be produced from a product side. The nitrogen product can have a purity of at least about 90 vol %, a temperature of about 440° C., and a pressure of about 20.7 bara (~2.07 MPa). After a sufficient amount of $CO_2$ is adsorbed, such as about 85% of the capacity of the adsorbent, a blow down step can be started. The blow down step is performed for ~40 seconds in the forward (flow) direction. At the end of the blow down step, the reactor vessel can be at a pressure of about 1.5 bara (~150 kPa). The blowdown can be performed either solely in the forward (flow) direction where only the product end is opened, or a first blowdown in the forward (flow) direction can be performed, followed by a second blowdown where both feed and product ends are opened. Other combinations of these sequences of blowdown are additionally or alternately possible. After the blowdown, a relatively low pressure steam purge (about 1-1.5 bara, ~100-150 kPa) from the product side can be performed for about 205 seconds to sweep out adsorbed carbon dioxide. The relatively low pressure steam purge can generate an output stream containing water and carbon dioxide at a pressure of about 1.48 bara (~148 kPa). After removal of water by condensation, the output stream can have a $CO_2$ purity of at least about 99 mol %. The output stream can also correspond to at least about 82% of the $CO_2$ present in the feed to the PSA reactor. Optionally, an additional nitrogen purge can be performed after the steam purge, in order to sweep out any steam and carbon dioxide remaining in the reactor. The vessel can then be re-pressurized from the feed side to return the PSA reactor vessel to the initial pressure of ~21 bara (~2.1 MPa) for performing the separation of the feed gas. The re-pressurization can be performed using product gas for ~55 seconds. The conduct of this PSA cycle can allow separation of carbon dioxide from nitrogen contained in a turbine exhaust gas, such as a recycled exhaust gas, such that carbon dioxide can be recovered at a rate of at least 80% and with a purity of at least 99% (after condensing out water). The cycle can also use a reduced amount of steam, such as about 0.59 mol steam per mol of carbon dioxide recovered as product.

EXAMPLE 6

Performing PSA on a Portion of Recycled Exhaust for High Purity $CO_2$

The following prophetic example is based on a configuration for a pressure swing adsorption reactor similar to the configuration shown in FIG. 2. In this example, a mixed-metal oxide based adsorbent is used in a plurality of PSA reactors to separate $CO_2$ and $N_2$. The separation is performed at a temperature of about 440° C. The PSA reactors can correspond to ~4 horizontally aligned vessels. The reactors can include an adsorbent configuration suitable for use in a horizontal alignment for input flow perpendicular to the long axis of the reactor, such as parallel plate adsorbents and/or adsorbent bed(s). The reactor vessels can have a long axis of about 35 m and a short axis of about 4 m. The reactors can be deployed in a cycle including a sequence of steps. The first step in the cycle is a feed step at relatively high pressure, such as ~21 bara (~2.1 MPa), for about 200 seconds during which feed gas is supplied to a feed end of a PSA reactor vessel. An example of a feed gas can include or be the recycled turbine exhaust gas from a low emission power generation system. The turbine exhaust gas can be delivered to the PSA vessel at a temperature of about 440° C. An example of a turbine exhaust gas composition can be ~11 vol % $CO_2$, ~84 vol % $N_2$, and a remaining amount of water and other trace species. As the feed gas is supplied to a feed end of the vessel, a nitrogen product can be produced from a product side. The nitrogen product can have a purity of at least about 90 vol %, a temperature of about 440° C., and a pressure of about 20.7 bara (~2.07 MPa). After the feed step, a blow down step can be performed for ~35 seconds in the forward (flow) direction. After the blowdown, a relatively low pressure steam purge (about 1-1.5 bara, ~100-150 kPa) from the product side can be performed for about 530 seconds to sweep out adsorbed carbon dioxide. The relatively low pressure steam purge can generate an output stream containing water and carbon dioxide at a pressure of about 1.85 bara (~185 kPa). After removal of water by condensation, the output stream can have a $CO_2$ purity of at least about 99 mol %. The output stream can also correspond to at least about 72% of the $CO_2$ present in the feed to the PSA reactor. The vessel can then be re-pressurized from the feed side to return the PSA reactor vessel to the initial pressure of ~21 bara (~2.1 MPa) for performing the separation of the feed gas. The re-pressurization can be performed using product gas for ~35 seconds. The conduct of this PSA cycle can allow separation of carbon dioxide from nitrogen contained in a turbine exhaust gas, such as a recycled exhaust gas, such that carbon dioxide can be recovered at a rate of at least 70% and with a purity of at least 99% (after condensing out water). The cycle can also use a reduced amount of steam, such as about 0.77 mol steam per mol of carbon dioxide recovered as product.

EXAMPLE 7

Performing PSA on a Portion of Recycled Exhaust for High Purity $CO_2$

The following prophetic example is based on a configuration for a pressure swing adsorption reactor similar to the configuration shown in FIG. 2. In this example, a mixed-metal oxide based adsorbent is used in a plurality of PSA reactors to separate $CO_2$ and $N_2$. The separation is performed at a temperature of about 440° C. The PSA reactors can correspond to ~4 horizontally aligned vessels. The reactors can include an adsorbent configuration suitable for use in a horizontal alignment for input flow perpendicular to the long axis of the reactor, such as parallel plate adsorbents. The reactor vessels can have a long axis of about 35 m and a short axis of about 4 m. The reactors can be deployed in a cycle including a sequence of steps. The first step in the cycle is a feed step at relatively high pressure, such as ~21 bara (~2.1 MPa), for about 200 seconds during which feed gas is supplied to a feed end of a PSA reactor vessel. An example of a feed gas can include or be the recycled turbine exhaust gas from a low emission power generation system. The turbine exhaust gas can be delivered to the PSA vessel at a temperature of about 440° C. An example of a turbine exhaust gas composition can be ~11 vol % $CO_2$, ~84 vol % $N_2$, and a remaining amount of water and other trace species. As the feed gas is supplied to a feed end of the vessel, a nitrogen product can be produced from a product side. The nitrogen product can have a purity of at least about 90 vol %, a temperature of about 440° C., and a pressure of about 20.7 bara (~2.07 MPa). After the feed step, a blow down step can be performed for ~35 seconds in the forward (flow) direction. After the blowdown, a relatively low pressure steam purge (about 1-1.5 bara, ~100-150 kPa) from the product side can be performed for about 530 seconds to sweep out adsorbed carbon dioxide. The relatively low pressure steam purge can generate an output stream containing water and carbon dioxide at a pressure of about 2.85 bara (~285 kPa). After removal of water by condensation, the output stream can have a $CO_2$ purity of at least about 97 mol %. The output stream can also correspond to at least about 65% of the $CO_2$ present in the feed to the PSA reactor. The vessel can then be re-pressurized from the feed side to return the PSA reactor vessel to the initial pressure of ~21 bara (~2.1 MPa) for performing the separation of the feed gas. The re-pressurization can be performed using product gas for ~35 seconds. The conduct of this PSA cycle can allow separation of carbon dioxide from nitrogen contained in a turbine exhaust gas, such as a recycled exhaust gas, such that carbon dioxide can be recovered at a rate of at least 60% and with a purity of at least 97% (after condensing out water). The cycle can also use a reduced amount of steam, such as about 0.65 mol steam per mol of carbon dioxide recovered as product.

EXAMPLE 8

Performing PSA on a Portion of Recycled Exhaust

The following prophetic example is based on a configuration for a pressure swing adsorption reactor similar to the configuration shown in FIG. 2. In this example, a mixed-metal oxide based adsorbent is used in a plurality of PSA reactors to separate $CO_2$ and $N_2$. The separation is performed at a temperature of about 440° C. The PSA reactors can correspond to ~3 horizontally aligned vessels. The reactors can include an adsorbent configuration suitable for use in a horizontal alignment for input flow perpendicular to the long axis of the reactor, such as parallel plate adsorbents and/or adsorbent bed(s). The reactor vessels can have a long axis of about 30 m and a short axis of about 4 m. The reactors can be deployed in a cycle including a sequence of steps. The first step in the cycle is a feed step at relatively high pressure, such as ~21 bara (~2.1 MPa), for about 110 seconds during which feed gas is supplied to a feed end of a PSA reactor vessel. An example of a feed gas can include or be the recycled turbine exhaust gas from a low emission power generation system. The turbine exhaust gas can be delivered to the PSA vessel at a temperature of about 440° C. An example of a turbine exhaust gas composition can be ~11 vol % $CO_2$, ~84 vol % $N_2$, and a remaining amount of water and other trace species. As the feed gas is supplied to a feed end of the vessel, a nitrogen product can be produced from a product side. The nitrogen product can have a purity of at least about 90 vol %, a temperature of about 440° C., and a pressure of about 20.7 bara (~2.07 MPa). After the feed step, blowdown steps can be performed for ~5 seconds in the reverse (counter-flow) direction, followed by ~25 seconds in the forward (flow) direction. After the blowdown steps, a relatively low pressure steam purge (about 1-1.5 bara, ~100-150 kPa) from the product side can be performed for about 173 seconds to sweep out adsorbed carbon dioxide. The relatively low pressure steam purge can generate an output stream containing water and carbon dioxide at a pressure of about 1.35 bara (-135 kPa). After removal of water by condensation, the output stream can have a $CO_2$ purity of at least about 63 mol %. The output stream can also correspond to at least about 69% of the $CO_2$ present in the feed to the PSA reactor. The vessel can then be re-pressurized from the feed side to return the PSA reactor vessel to the initial pressure of ~21 bara (~2.1 MPa) for performing the separation of the feed gas. The re-pressurization can be performed using product gas for ~17 seconds. The conduct of this PSA cycle can allow separation of carbon dioxide from nitrogen contained in a turbine exhaust gas, such as a recycled exhaust gas, such that carbon dioxide can be recovered at a rate of at least 65% and with a purity of at least 60% (after condensing out water).

EXAMPLE 9

Performing PSA on a Portion of Recycled Exhaust

FIG. 3 shows how the recovery (represented as a molar ratio) and purity (represented as a percent) trade off against steam usage for exemplary PSA configurations that can further illustrate the invention. For each of the cases shown, the feed composition and pressure are similar to those described in the examples above. In FIG. 3, either ~3-vessel or ~4-vessel PSA configurations are illustrated for typical adsorbent properties of mass transfer and adsorbent capacity. As seen in FIG. 3, higher purity $CO_2$ (>95 vol %) can be achievable with increased steam usage, but still less than ~1.0 mol/mol of $CO_2$ recovered. In addition, the use of ~4 PSA vessels can allow a reduced pressure swing via the use of a higher relative purge pressure (>about 1.35-1.5 bara, typically from ~2 bara to ~3 bara), which can reduce both equipment and energy requirements for subsequent $CO_2$ compression prior to use in EOR facilities. Further improvement of the ~4-vessel recoveries shown in FIG. 3 can be obtained using configurations where the vessels are in fluid communication with each other.

EXAMPLE 10

3-Vessel PSA Configuration Using a Portion of Recycled Exhaust

Figures 4, 5, 6, 7:
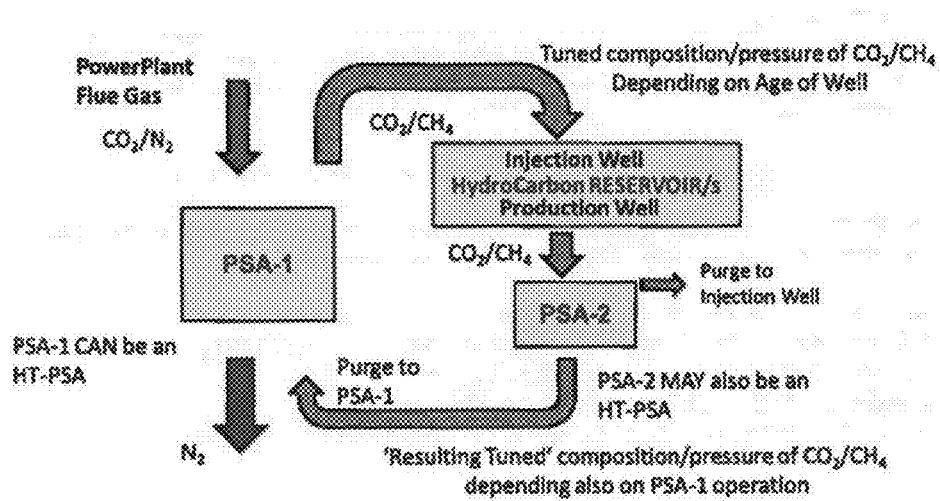
FIG. 4 pictorially shows the cycle setup of a 3-vessel sorptive arrangement without interconnection between vessels.
FIG. 5 pictorially shows the cycle setup of a 4-vessel sorptive arrangement without interconnection between vessels.
FIG. 6 pictorially shows the cycle setup of a 4-vessel sorptive arrangement with some level of interconnection between vessels.
FIG. 7 schematically shows an example of a dual PSA for integrated emissions control and hydrocarbon production.

FIG. 4 shows a 3-vessel configuration that is illustrative but not limiting of one possible arrangement of adsorber vessels within the scope of the invention. In this configuration, one vessel is on feed and hence making nitrogen product at all times. The other two vessels can be undergoing other steps of the cycle, e.g., that regenerate the adsorbent, whilst the first vessel is making product at relatively high pressure. In this particular 3-vessel arrangement, there is no fluid connection (i.e., exchange of gas streams) between the vessels, which reduces cycle complexity as well as equipment such as interconnecting piping and valving.

EXAMPLE 11

4-Vessel PSA Configuration Using a Portion of Recycled Exhaust

FIGS. 5-6 show 4-vessel configurations that are illustrative but not limiting of another possible arrangement of adsorber vessels within the scope of the invention. In the configurations of FIGS. 5-6, at least one vessel is on feed at all times. Two or three of the other vessels can be undergoing other steps of the cycle, e.g., that regenerate the adsorbent, whilst the at least one vessel is making product at relatively high pressure. In the particular 4-vessel arrangement of FIG. 5, there is no fluid connection (i.e., exchange of gas streams) between the vessels, which reduces cycle complexity as well as equipment such as interconnecting piping and valving. However 4-vessel arrangements permit cycles to be conducted whereby two of the vessels not on feed can exchange gas, e.g., by employing a pressure equalization step whereby a first vessel at relatively higher pressure can be depressurized into a second vessel at relatively lower pressure, thereby increasing the pressure of the second vessel and decreasing the pressure of the first vessel, such as shown in FIG. 6. This type of cycle can permit higher ($CO_2$) recovery, since the stream(s) containing the target gas ($CO_2$) is(are) not released to the ambient atmosphere, but is(are) sent to another adsorbent vessel. The advantages of higher recovery from using a 4-vessel configurations (or configurations using more than 4 vessels) can be offset to some extent by the increased cost of added vessels, interconnecting piping and valving, and associated cycle control equipment required.

EXAMPLE 12

Dual Integrated PSA System for Integrated Emissions Control and Hydrocarbon Production FIG. 7 shows an application of a pressure swing absorption process described above. The application may be a system that includes a power plant (not shown) which produces flue gas at a relatively high pressure and temperature. The flue gas of this example is a mix of primarily $CO_2$ and $N_2$. In addition to the power generating plant (e.g., power generation system 100 in FIG. 1), the system may include two PSAs and a hydrocarbon producing reservoir, where an injection well and a production well may be drilled near one another. The production well may be drilled in a hydrocarbon pay-zone in order to extract the hydrocarbons present in the reservoir. The injection well may be drilled in the vicinity of the production well in order to affect, e.g., pressure in the reservoir, or the content and the properties of the produced hydrocarbons, and, thereby, enhance the production.

Out of the two PSAs in the system, at least PSA-1 may be the pressure swing adsorber 210 shown in FIG. 2, which is able to adequately process the flue gas from the power plant arriving at a relatively high pressure and temperature. PSA-2, on the other hand, may be fed with a mix of gasses flowing from the production well, and, therefore, may not require the pressure and temperature capabilities of the pressure swing adsorber 210, for example. Thus, a conventional adsorber may be deemed suitable to be used as PSA-2, depending on the thermodynamic properties of the gas departing the production well.

The integrated emission control may begin by feeding the flue gas from the power plant into PSA-1. As shown, any gasses additional to $CO_2$ and $N_2$ will be omitted from the discussion and an approximation will be made that the flue gas consists of $CO_2$ and $N_2$ only.

In one embodiment, the flue gas from the power plant may be processed to be utilized in extracting hydrocarbons from an oil/gas rich formation. However, while the properties of $N_2$ allow for its usage mainly as a pressurizing agent, $CO_2$, on the other hand, can be particularly effective in driving the hydrocarbons out of the reservoir by mixing with them. In other words, $CO_2$ may be used to change composition and flow parameters of the produced oil/gas in order to facilitate the production, without affecting the chemical properties of the oil/gas. In order to optimize the introduction of $CO_2$, the composition of $CO_2$ needs to be controlled, and the typical apportion of $N_2$ in the flue gas may render the mix of the flue gas unusable for such a purpose. Hence, $CO_2$ may need to be separated from $N_2$ to prepare it for injection in the hydrocarbon reservoir.

As illustrated in FIG. 7, the separation of $CO_2$ and $N_2$ may be performed by PSA-1. The flue gas may enter PSA-1 at ~20bara, where $CO_2$ may be adsorbed and $N_2$ may be recovered and stored to be used for a variety of industrial applications (or, as will be discussed in reference to FIG. 8, $N_2$ may be recycled back into the system). PSA-1 may be placed between the power plant and an injection well that may intake $CO_2$ adsorbed by PSA-1. The injection well may be drilled near a hydrocarbon reservoir in order to modify the properties of the reservoir and optimize recovery of hydrocarbons. Of note, $CO_2$ required by the injection well may be a function of the composition of the hydrocarbons to be extracted. Accordingly, an ability of PSA-1 to adjust its adsorption cycle may provide a significant benefit. Namely, in addition to merely providing $CO_2$ by removing $N_2$, PSA-1 may also optimize the composition of $CO_2$ flowing from the power plant to be suitable to the requirements of a particular reservoir. For example, as the reservoir ages, it may require levels of injected $CO_2$ to vary with the aging process, which may be accomplished by setting the adsorption cycle to be suitable for any stage of the life of the reservoir.

Once the $CO_2$ is removed from PSA-1, it may mix with $CH_4$ that is present in the air above the injection well and a tuned composition of $CO_2/CH_4$ may be formed to be injected. Further, the injection well may be in communication with the production well and the injection of the $CO_2/CH_4$ composition may affect the extraction of oil/gas from the reservoir. The produced hydrocarbons may have a liquid and a gaseous phase. Considering that $CO_2$ may be introduced to mix with the hydrocarbons to facilitate the flow, the gaseous phase may be a $CO_2/CH_4$ mixture. Thus, a separation of $CO_2$ and $CH_4$ may be necessary in order to purify $CH_4$ as one of the end products of the system.

The natural gas purification may occur in PSA-2. As mentioned above, in instances where the produced $CO_2/CH_4$ mixture is at a pressure substantially lower than the pressure of flue gas exiting the power plant (~20bara), a conventional adsorber may be used as PSA-2. Depending on the temperature of the produced $CO_2/CH_4$ mixture, PSA-2 may be a hot PSA. PSA-2 may adsorb $CO_2$ from the mixture and permit flow of purified $CH_4$ as the light component of PSA-2. Depending on the properties of the gas entering PSA-2 from the production well, the gas exiting PSA-2 may be used back in the system as a purging agent in PSA-1. In addition, a component of the gas entering PSA-2 from the production well may flow through and purge PSA-2 to the injection well.

EXAMPLE 13

Dual Integrated PSA System with $N_2$ Purge of at Least One PSA

Figure 8:
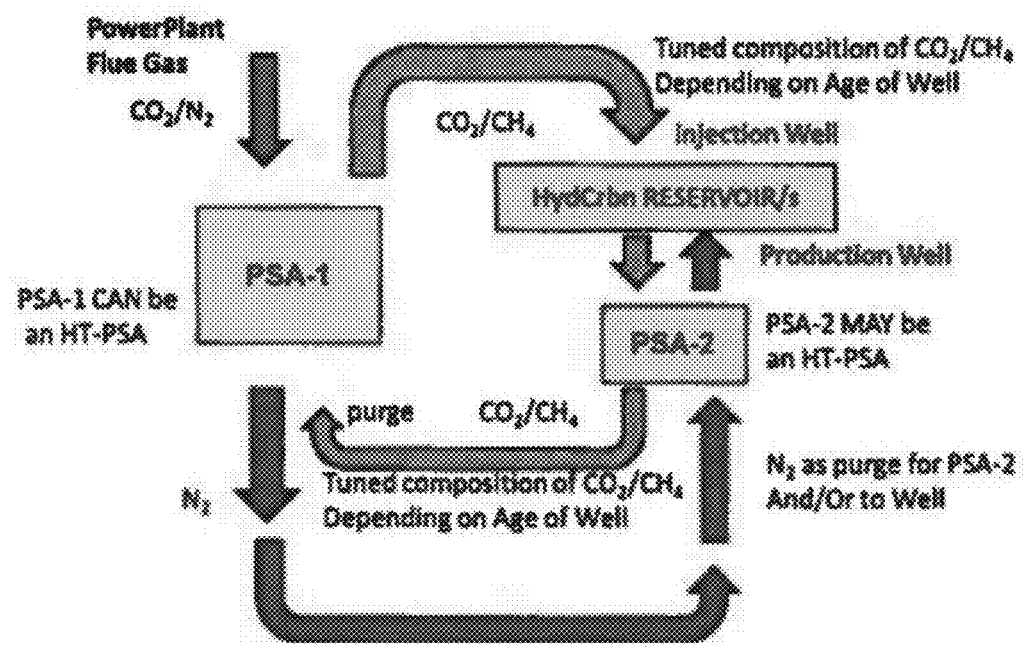
FIG. 8 schematically shows an example of a dual PSA for integrated emissions control and hydrocarbon production with $N_2$ purge of one of the PSAs.

FIG. 8 shows an example where $N_2$ may be redirected to be used back in the dual integrated PSA system. As mentioned, when the flue gas is introduced in PSA-1 at, for example, ~20bara, the pressure of $N_2$ exiting the adsorber may remain relatively high (~19bara). As a result, in this example $N_2$ is used as a pressurizing agent to purge PSA-2, and/or, to further increase the pressure of the hydrocarbons in the zone of interest of the reservoir in order to push them out of the rock. This is possible because $N_2$ is an inert gas that is unlikely to affect the chemical content of the hydrocarbons in the formation.

Although the present invention has been described in terms of specific embodiments, it need not necessarily be so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:
1. A method, comprising:
passing exhaust gas from a power generation plant to a first swing adsorption reactor, wherein the exhaust gas includes $CO_2$ and $N_2$;
adsorbing the $CO_2$ from the exhaust gas on a first adsorbent material of the first swing adsorption reactor, wherein an adsorption cycle of the first swing adsorption reactor is variable;
injecting the $CO_2$ adsorbed by the first swing adsorption reactor, along with $CH_4$ from a production well, in a hydrocarbon reservoir by using an injection well;
producing a mixture of hydrocarbons, including at least $CH_4$, and $CO_2$ by using the production well, which is in communication with the injection well; and
purifying the mixture of hydrocarbons, which includes at least a mixture of $CH_4$ and $CO_2$ by adsorbing the $CO_2$ mixed with the mixture of hydrocarbons on a second adsorbent material of a second swing adsorption reactor, wherein a mixture of $CO_2$ adsorbed by the second swing adsorption reactor, steam, and $CH_4$ from the production well are used to purge the first swing adsorption reactor, and an amount of steam used in the purge of the first swing adsorption reactor increases as an amount of $CO_2$ used to produce the mixture hydrocarbons increases.

2. The method of claim 1, wherein a $N_2$ stream unadsorbed by the first swing adsorption reactor exits the first swing adsorption reactor at a pressure that is substantially the same as a pressure of the exhaust gas from the power generation plant.

3. The method of claim 1, further comprising:
recovering a $N_2$ stream unadsorbed by the first swing adsorption reactor.

4. The method of claim 1, further comprising:
purging the second swing adsorption reactor with a stream of $N_2$ unadsorbed by the first swing adsorption reactor.

5. The method of claim 1, further comprising:
feeding at least a portion of the purified hydrocarbons back into the power generation plant and generating power.

6. The method of claim 1, further comprising:
varying the adsorption cycle of the first swing adsorption reactor to adjust composition of adsorbed $CO_2$ based on a composition of hydrocarbons in the hydrocarbon reservoir.

7. The method of claim 6, wherein the composition of the hydrocarbons in the hydrocarbon reservoir varies with age of the reservoir.

8. The method of claim 1, wherein at least one of the first swing adsorption reactor and the second swing adsorption reactor is a high-temperature reactor.

9. The method of claim 1, further comprising:
purging the second swing adsorption reactor with at least one of a stream of $CO_2$ and a stream of $CH_4$ flowing from the production well.

10. A system, comprising:
a power generation plant that produces exhaust gas, wherein the exhaust gas includes $CO_2$ and N2;
a first swing adsorption reactor, wherein the power generation plant passes the exhaust gas to the first swing adsorption reactor, wherein the first swing adsorption reactor adsorbs the $CO_2$ from the exhaust gas on a first adsorbent material of the first swing adsorption reactor, and wherein an adsorption cycle of the first swing adsorption reactor is variable;
an injection well that injects the CO2 adsorbed by the first swing adsorption reactor along with $CH_4$ from a production well, in a hydrocarbon reservoir;
the production well that is in communication with the injection well and that produces a mixture of hydrocarbons, including at least CH4, and $CO_2$; and
a second swing adsorption reactor that purifies the mixture of hydrocarbons, which includes at least a mixture of $CH_4$ and $CO_2$, from the production well by adsorbing the $CO_2$ mixed with the mixture of hydrocarbons on a second adsorbent material of the second swing adsorption reactor, wherein a mixture of $CO_2$ adsorbed by the second swing adsorption reactor, steam, and $CH_4$ from the production well are used to purge the first swing adsorption reactor, and an amount of steam used in the purge of the first swing adsorption reactor increases as an amount of $CO_2$ used to produce the mixture hydrocarbons increases.

11. The system of claim 10, wherein the adsorption cycle of the first swing adsorption reactor is varied to adjust composition of adsorbed $CO_2$ based on a composition of hydrocarbons in the hydrocarbon reservoir.

12. The system of claim 10, wherein at least a portion of the purified hydrocarbons are fed back into the power generation plant to generate power.

* * * * *